United States Patent
Wang

(10) Patent No.: US 8,314,527 B2
(45) Date of Patent: *Nov. 20, 2012

(54) ADVANCED FLYWHEEL AND METHOD

(75) Inventor: Jimpo Wang, Westford, MA (US)

(73) Assignee: Beacon Power, LLC, The Woodlands, TX (US)

( * ) Notice: Subject to any disclaimer, the term of this patent is extended or adjusted under 35 U.S.C. 154(b) by 315 days.

This patent is subject to a terminal disclaimer.

(21) Appl. No.: 12/646,469

(22) Filed: Dec. 23, 2009

(65) Prior Publication Data

US 2010/0156219 A1   Jun. 24, 2010

Related U.S. Application Data

(63) Continuation-in-part of application No. 11/820,255, filed on Jun. 20, 2007, now Pat. No. 7,679,247.

(51) Int. Cl.
*H02K 7/09* (2006.01)
(52) U.S. Cl. ........ 310/90.5; 310/12.01; 310/39; 310/74; 310/153; 310/269
(58) Field of Classification Search ............ 310/12–39, 310/74, 90.5, 153, 216, 269; *H02K 7/09*
See application file for complete search history.

(56) References Cited

U.S. PATENT DOCUMENTS

| | | | |
|---|---|---|---|
| 2,747,944 A * | 5/1956 | Baermann | 310/90.5 |
| 3,791,704 A | 2/1974 | Perper | |
| 3,860,300 A | 1/1975 | Lyman | |
| 4,285,552 A | 8/1981 | Sutter | |
| 5,101,130 A | 3/1992 | Jayawant et al. | |
| 5,153,475 A * | 10/1992 | McSparran | 310/216.021 |
| 5,406,157 A * | 4/1995 | New | 310/90.5 |
| 5,614,777 A | 3/1997 | Bitterly et al. | |
| 5,710,469 A | 1/1998 | Ries | |
| 5,894,181 A | 4/1999 | Imlach | |
| 5,898,244 A | 4/1999 | Kotsianas et al. | |
| 6,025,668 A | 2/2000 | Kolomeitsev | |
| 6,259,179 B1 | 7/2001 | Fukuyama et al. | |
| 6,566,775 B1 * | 5/2003 | Fradella | 310/90.5 |
| 6,703,735 B1 * | 3/2004 | Gabrys | 310/90.5 |
| 6,794,777 B1 | 9/2004 | Fradella | |
| 7,679,247 B2 * | 3/2010 | Wang | 310/90.5 |
| 2007/0164626 A1 | 7/2007 | Taniguchi et al. | |
| 2010/0156219 A1 * | 6/2010 | Wang | 310/90.5 |

OTHER PUBLICATIONS

PCT search report and written opinion dated Nov. 26, 2008 for international application No. PCT/US 08/07709PCT.

* cited by examiner

*Primary Examiner* — John K Kim
(74) *Attorney, Agent, or Firm* — Osha Liang LLP

(57) ABSTRACT

A flywheel levitation apparatus and associated method are described for use in a flywheel driven power storage system having a rotor and which provides for an upward vertical movement of the rotor along an axis of rotation. The rotor includes a rotor face defining a cutaway section. A magnetic lifting force is applied to the rotor to at least in part serve in levitating the rotor. The magnetic lifting force exhibits a modified gap sensitivity that is smaller as compared to a conventional gap sensitivity that would be exhibited in an absence of the cutaway section.

30 Claims, 14 Drawing Sheets

ADVANCED FLYWHEEL AND METHOD

RELATED APPLICATION

The present application is a continuation in part of U.S. patent application Ser. No. 11/820,255 filed Jun. 20, 2007, now U.S. Pat. No. 7,679,247 entitled LIFT MAGNET MECHANISM FOR FLYWHEEL POWER STORAGE SYSTEMS which is incorporated herein by reference in its entirety.

BACKGROUND

The present invention is related at least generally to flywheel driven power storage systems and, more particularly, to an advanced flywheel driven power storage system and associated method that exhibits improved levitation force.

A flywheel may be regarded as a mechanical device, having a significant moment of inertia that may be used as a storage device for rotational energy. For example, flywheels resist changes in their rotational speed such that an energy input or an energy output is required order to change the rotational speed of a given rotating flywheel. In purely mechanical systems, such as an automobile engine, this requirement may cause the flywheel to exert a stabilizing influence on the system. The same holds for electro-mechanical systems. For example, an electrical motor may include a flywheel for resisting sudden changes in rotational speed of the motor.

In recent decades, flywheels have been employed in electro-mechanical systems that may be configured as electrical storage devices such that the devices can be electrically charged and discharged in a manner that is at least generally analogous to the charging and discharging of conventional rechargeable batteries. In this context, a flywheel can be "charged", for storing energy by using electrical energy provided, for example, through electrical cables to increase the speed of the flywheel to cause an increase in the rotational energy. The flywheel can be subsequently discharged by decreasing the speed to cause a decrease in the rotational energy of the flywheel while converting this rotational energy into electrical energy for delivery, for example through electrical cables, from the flywheel to some external load.

An electrical machine can be attached to a rotating flywheel, for example, using a single shaft, and configured for operating in one of several modes including but not limited to (i) a charging mode with the electrical machine operating as a motor for receiving electrical energy and for increasing the rotational speed of the flywheel, and (ii) a discharging mode with the electrical machine operating as a generator for providing electrical energy via a decrease in the speed of the flywheel and (iii) a float mode with the electrical machine spinning freely without adding or subtracting rotational energy to or from the wheel. It is noted that in the float mode a given flywheel may exhibit residual power losses, for example due to frictional losses, that may cause at least gradual decreases in stored rotational energy even if no electrical power is entering or leaving the flywheel through the electrical machine. For purposes of descriptive clarity, and based on well known conventions, it is noted that an electrical machine attached to a flywheel and configured for operation in one or more of these three modes may be referred to hereinafter as a motor.

It will be readily appreciated by a person of ordinary skill in the art that a maximum energy storage capacity of a flywheel system may depend on a maximum rotational speed at which the flywheel can be rotated, without bursting or otherwise failing as a result of internal stresses for example due to centrifugal forces, and that an increase in the maximum speed causes a corresponding increase in the maximum storage capacity in proportion to the square of the maximum speed. It will be further appreciated that the maximum rotational speed can be sufficiently high that the presence of any ambient gas at atmospheric pressure can cause severe power loss and overheating that can result in catastrophic failures. For example, flywheel systems described throughout this disclosure may operate at rotational speeds well above 10,000 rpm, and, in some applications, a vacuum pressure of less than 10 mTorr is required in order to avoid excessive power loss and rotor heating. In view of these considerations and based on well known techniques, it is often necessary to contain a flywheel in a housing that at least provides an airtight seal for supporting low pressure vacuum surrounding the flywheel rotor.

Turning now to the figures, FIG. 1 is a diagrammatic elevational view, in cross-section, illustrating one example of a prior art electro-mechanical flywheel unit, generally indicated by the reference number 100, that can be utilized for storing rotational energy as part of an electrical energy storage system. Flywheel unit 100 includes a flywheel rotor assembly, generally indicated by reference number 105 having a rotatable shaft 110 that supports a rim 115 using a hub 120 for rotation as indicated by an arrow 122 in a selected direction which can be either clockwise or counterclockwise. The flywheel unit of the present example may be contained in an airtight sealed housing 125 that at least supports low vacuum therein and that provides at least some degree of containment in the event of a high speed failure such as delamination of the rim. Furthermore, flywheel housing 125 may be configured to provide structural support for a number of components therein, as will be described immediately hereinafter.

Flywheel unit 100 includes an electrical motor 126, shown within a dashed rectangle, having a motor rotor assembly 135 that is connected with shaft 110 for co-rotation with the shaft, and a motor stator assembly 140 that is supported by housing 125 through a support structure 145, as needed.

Based on well known techniques, the flywheel rotor may be radially constrained using a lower bearing assembly 150 and an upper bearing assembly 150'. The bearing assemblies can be supported by lower and upper mechanical damper assemblies 155 and 155', respectively, that are connected to housing 125 through support structure 145.

Based on well known principles of mechanics, the maximum storage capacity of flywheel unit 100 may depend in part on the weight of the rotor such that a heavier rotor, with a given maximum speed, may exhibit a proportionally higher storage capacity as compared to a lighter rotor. Furthermore, it will be appreciated that bearing assemblies capable of operating at high maximum rotational speeds, for example above 15,000 rpm, may be incapable, at least when operating at such high speeds, of withstanding axial forces of more than just a few pounds. In this regard, it is often desirable to configure a given flywheel unit with a flywheel levitation apparatus for limiting axial forces on the bearings by supporting at least a majority of the weight of the rotor in the axial direction using a flywheel levitation apparatus.

In view of the foregoing discussions, flywheel unit 100 further includes a magnetic flywheel levitation apparatus 160, indicated in FIG. 1 within a dashed rectangle. An annular rotor 163 forms part of the levitation apparatus and is connected with shaft 110 for co-rotation and vertical movement therewith. Rotor 163 may be composed of a magnetic material such as, for example, iron. An annular stator assembly forms another part of the levitation apparatus and is indicated by the reference number 166. Stator assembly 166 is supported by support structure 145 and is configured as an electromagnet, as will be described in detail at appropriate points hereinafter, for receiving a variable electrical current (not shown) and for magnetically applying an axial lifting force upon rotor 163 that is produced, at least in part, by this current.

The flywheel levitation apparatus may be configured, as will be described in detail hereinafter, for providing sufficient upward force upon rotor 163 for fully levitating the entire weight of the flywheel rotor. In many cases, this may be regarded as a highly desirable mode of operation at least for the reason that the bearings in this mode may be subjected, at least on average, to limited axial forces, for example resulting from slight flexure of the bearing dampers, that are sufficiently low at least for avoiding short-term damage to the bearings. One well known approach for enabling full levitation of a flywheel includes configuring the upper and lower dampers to exhibit sufficient axial compliance to allow the flywheel to move vertically with correspondingly low axial restraint such that a vertical height of the flywheel rotor is primarily influenced by the flywheel levitation apparatus, and not by the dampers. It will be further appreciated that in the context of many well known fully-levitated flywheel configurations there is often a need to employ some form of closed-loop feedback, for example utilizing a position sensor, for monitoring the height of the flywheel and controllably adjusting the variable current for the lift apparatus, responsive to the vertical height, for controlling vertical movement of the flywheel rotor assembly to at least approximately maintain some predetermined axial height.

With ongoing reference to FIG. 1, flywheel unit 100 may include a position sensor 170 for monitoring a vertical height of the flywheel rotor by measuring a sensor gap 173 having a sensor gap size that varies responsive to a vertical movement 174 indicated in FIG. 1 by a double-ended arrow. Based on well known techniques, during continuous operation of the flywheel unit, the current provided to the stator of the levitation apparatus may be varied in response to signals produced by position sensor 170, such that a predetermined sensor gap size is maintained, at least to within a range of values.

Attention is now directed to FIG. 2 which is a diagrammatic enlarged fragmentary view, in perspective, of a portion of flywheel unit 100 of FIG. 1. FIG. 2 illustrates a number features already shown in FIG. 1, and is included for purposes of clarity at least to illustrate the cylindrical symmetry of flywheel levitation apparatus 160 as well as a number of components, including rotor 163 and stator assembly 166.

Attention is now directed to FIG. 3, which is a diagrammatic cutaway view, in elevation, of a portion of flywheel unit 100 including flywheel levitation apparatus 160 for purposes of facilitating the introduction of further details with respect to its operation. As described previously, rotor 163 is connected for co-rotation with shaft 110 and may be composed of a magnetic material such as, for example, iron. Stator assembly 166 is supported by support structure 145 and is configured to receive a variable electrical current. The stator assembly generates a total magnetic flux 176, schematically indicated in FIG. 3 by a solid line, that may include a variable magnetic flux 178, produced by an electrical coil 180 responsive to the variable current, and a steady magnetic flux 182 produced, for example, by a permanent magnet 184. It should be appreciated that a single permanent magnet may be used, or a suitable arrangement of a plurality of permanent magnets. For this reason, item 184 may be referred to below as a permanent magnet arrangement that can be made up of one or more permanent magnets. It is noted that the fluxes are shown in the components to the left of shaft 110 in the view of the figure in order to facilitate illustrative clarity, but are understood to be present throughout the annular configuration of these components as is the case for magnetic flux illustrations in subsequent ones of the figures. In the illustrated embodiment, electrical coil 180 may be supported in a number of different ways, and may be wound based on well known techniques commonly employed, for example, in production of conventional voice coils or other magnetic actuators. It is noted that, in certain cases, the flywheel may be operated at sufficiently low vacuum pressure such that the immediate ambient surroundings near the coil provide little or no heat path to reduce heating caused by resistive losses in the coil, and it may be desirable to support the electrical coil in a manner that provides an adequate heat path for maintaining a sufficiently low temperature in the coil. For example, it may be desirable to encase the coil within a thermally conductive resin 185 such as a thermally conductive two-part epoxy. An inner pole piece 186 includes a projecting section 188 that extends downward toward an upper surface 190 of rotor 163. The inner pole piece is configured, based on well known principles of magnetism, for channeling the magnetic flux toward upper surface 190 of the rotor, and across a rotor-stator gap 192 to exert a magnetic lifting force 194 upon the rotor, as indicated in FIG. 3 by an arrow. Again, the reference numbers applied to components of the stator assembly have been shown only to the right of shaft 110 for purposes of clarity, but it is to be understood that these components are annular in configuration.

The stator assembly further includes a permanent magnet arrangement having permanent magnet 184 arranged in magnetic communication with inner pole piece 186 for contributing to the magnetic flux. An outer pole piece 196 is arranged in magnetic communication with permanent magnet 184 and extends downward toward upper surface 190 of rotor 163. In one conventional embodiment, the permanent magnet arrangement may include a single ring-shaped magnet having (i) a north pole N that is aligned in a confronting relationship with an input surface of the inner pole piece and (ii) a south pole S that confronts an additional input surface of the outer pole piece. The magnet poles are not required to be oriented as shown and may be reversed. It will be readily appreciated by a person of ordinary skill in the art that the inner pole piece and outer pole piece of the present embodiment are configured to cooperate with one another, and with the magnet and the rotor, such that total magnetic flux 176 is channeled through a magnetic circuit as indicated in FIG. 3, that passes through (i) the outer pole piece, (ii) the rotor and (iii) the inner pole piece. It will be further appreciated that total magnetic flux 176 includes one contribution from the permanent magnet, which produces steady magnetic flux 182 to cause a corresponding steady upward force 204 on the rotor, and another contribution from the coil, based on variable magnetic flux 178 to produce a variable upward force 206. The latter varies responsive to a variable current provided to the coil, for example, from a control unit (not shown). It is noted that total upward force 194 produced by total magnetic flux 176 includes the sum of steady upward force 204 and variable upward force 206. Further, it should be appreciated that the steady force is steady for a given width of gap size 173 but can change in magnitude responsive to changes in the gap size, as anyone who has handled a permanent magnet will appreciate. In the instance of a permanent magnet arrangement including a plurality of permanent magnets that cooperate with one another to define a pair of opposing magnet surfaces diagrammatically shown by reference numbers 208*a* and 208*b* using dashed lines, the pole piece(s) provide an input surface confronting each magnet surface for receiving the steady magnetic flux. The pole pieces are aligned in a confronting relationship to receive the steady magnetic flux for channeling the flux to the rotor. The steady magnetic flux, produced by the magnet array, can exhibit spatial fluctuations across each input surface. A pole piece and/or pole pieces in cooperation can serve to smooth the steady magnetic flux such that the lower surface of the pole pieces exhibit output fluctuations that are reduced as compared to the spatial fluctuations at each input surface 208a and 208b.

While the foregoing description embraces sufficient details for at least supporting a general qualitative understanding of an overall manner in which the total magnetic field is channeled, a person of ordinary skill in the art will recognize that accurate quantitative analysis may require a more detailed three dimensional computational determination of the magnetic fields in and around the levitation apparatus. For example, with respect to a given embodiment of the levitation apparatus, it may be advantageous to provide accurate computations using finite element analysis (FEA) to determine a magnitude of steady force 204.

Attention is now directed to FIG. 4, which is a magnetic field map, generally indicated by the reference number 210 that has been produced by Applicant based on well known techniques in conjunction with commercially available software for performing finite element analysis (FEA). As indicated in FIG. 4 by the appropriate respective reference numbers, inner pole piece 186, outer pole piece 196, permanent magnet arrangement 184 and rotor 163 are diagrammatically represented, in cross-section, in a manner that is consistent with FIGS. 1-3. Magnetic field lines 216 (one of which is indicated) are superposed on these diagrams to represent a set of computational data corresponding to a three dimensional distribution of the total magnetic field, in and around the levitation apparatus, caused solely by the permanent magnet arrangement. The computational data has been produced using commercially available ANSYS® FEA software (in conjunction with a commonly available desktop personal computer) based in part on the geometrical shapes of these components, and their approximate magnetic material properties, as manually entered by Applicant through the standard ANSYS® graphical user interface. It is noted that while the components at hand are three dimensional objects, all being of annular configuration as explicitly illustrated by FIG. 2, it nevertheless will be appreciated by a person of ordinary skill in the art that the cylindrical symmetry of these shapes causes the magnetic fields, and therefore the computational data representative thereof, to exhibit rotational symmetry about a central axis of symmetry (not shown) such that it is sufficient, at least for purposes of visualization, to display the results in two dimensions. It is further noted that at least in the context of these computations, previously described coil 180 and resin 185 can be assumed to be composed of substantially non-magnetic material (such as copper, epoxy, and polymeric wire insulation) and therefore can be expected to cause no influence, at least to within an approximation, on magnetic fields in and around the levitation apparatus. Therefore, for purposes of illustrative clarity, the coil and the epoxy are omitted in FIG. 4.

A person of ordinary skill in the art, being familiar with these standard computational techniques, will recognize that at any given point, at least within conventional magnetic materials such as iron, the magnetic field at any given location (or point) in space may be at least approximately quantitatively characterized according to (i) an intensity and (ii) a spatial orientation. Based on well known conventions for graphically representing magnetic fields, the spatial orientation of the field at a location 214 (or any other location) can be represented by a field line 216 such that each field line represents a particular orientation. The intensity of the corresponding flux at that location can be interpreted as being inversely proportional to spacing between adjacent ones of the field lines, by way of example, in the manner of showing elevation on a topographic map.

As will be discussed in greater detail at appropriate points hereinafter, a magnetic field map such as that of FIG. 4 may provide a person of ordinary skill in the art at least with substantive qualitative insights as to the expected performance of a given magnetic system. Furthermore, inspection of field maps such as that of FIG. 4 may provide a person of ordinary skill in the art with useful insights for interpreting computational results as opposed to attempting to interpret a relatively massive amount of raw computational data. Concerning the latter point, it is noted that computational data produced by ANSYS® (or its equivalent) may be manipulated for reliably qualitatively characterizing various characteristics of the magnetic system with a high degree of accuracy. For example, as will be described immediately hereinafter, it is readily possible using the ANSYS software, and by employing well-known techniques, to process the computational data, represented by FIG. 4, for determining a magnitude of steady force 204 (FIG. 3) between stator 166 and rotor 163, corresponding to a gap size for rotator-stator gap 192, and to repeat the calculation for a range of gap sizes to provide a plot of the upward force for different gap sizes.

It is again noted that the field lines illustrated in FIG. 4 have been computed based solely on contributions of the permanent magnet arrangement, and therefore represent only the steady magnetic field. These field lines do not explicitly include any contribution from the variable magnetic field provided through the coil responsive to the variable magnetic current. It is to be understood, however, that the pole pieces will tend to channel the variable magnetic field, produced by the variable current through the coil, in substantially the same way that the pole pieces channel the steady magnetic field produced the permanent magnet, causing the magnetic field lines at least in and around rotor-stator gap 192 to exhibit at least approximately similar spatial distributions of directional orientations, for the variable and for the steady magnetic fields, even while the respective magnitudes of the variable and steady magnetic fields may be very different.

Attention is now turned to FIG. 5, which is a plot, generally indicated by the reference number 219, having a vertical axis 220, corresponding to a magnitude of steady force 204 due to the permanent magnet arrangement, and a horizontal axis corresponding to the value of gap 192. As described immediately above, Applicant employed well known techniques, in conjunction with ANSYS® software to determine a magnetic force profile 222 representing the magnitude of steady force 204, for example due to the permanent magnet arrangement, for a number of different gap sizes. In particular, for each gap size, the ANSYS® software was utilized for producing a corresponding set of computational data representing the magnetic field in and around the levitation apparatus, and for each set of computational data, a subset of that set was processed, through ANSYS, employing well known techniques for computing the force associated with that gap size.

Considering FIGS. 1 and 3 in conjunction with FIG. 5, it is noted that the magnitude of force 204, per plot 222, increases rapidly as the gap size diminishes, and that curve becomes increasingly nonlinear as the gap size approaches 40 mils. Applicant recognizes herein that this rapid nonlinear increase in force 204 may introduce substantial problems and/or challenges with respect to configuring and operating the flywheel levitation unit, as will be described at appropriate points hereinafter.

Referring once again to FIG. 3, Applicant recognizes that at least in the context of the illustrated flywheel unit, one design goal may be to limit the vertical movement of the flywheel rotor to at least generally avoid contact between the rotor and stator of the flywheel levitation apparatus. One well known technique for achieving this is to constrain or restrict the vertical movement of the flywheel rotor to a predetermined maximum height such that the rotor-stator gap is unable to decrease below a corresponding minimum value. In one embodiment, sensor 170 may be encased in a rigid sensor housing 224 defining a lower surface region 226, that faces an uppermost portion 228 of the shaft and is positioned to act as a stop that constrains vertical movement of the flywheel rotor to a predetermined maximum height. For example, surface region 226 may be aligned to prevent the rotor stator gap from decreasing below 40 mils.

Applicant further recognizes that the vertical movement of the flywheel, as described immediately above, may be limited in a way that at least generally avoids uncontrolled upward vertical movement of the flywheel. In particular, Applicant recognizes that if the flywheel lift apparatus is to be configured for controllably levitating the entire amount of rotated weight for a range of values of rotor-stator gap 192, it may at least be of benefit that steady upward force 204 (from the permanent magnet) can by itself be incapable of lifting the entire weight of the flywheel rotor, at least throughout the total range of values for gap 192. It is further noted that if this is not the case, and if the steady upward force can lift the entire weight of the flywheel, then vertical movement of the flywheel within the total range of values of the gap size, could cause the steady upward force to initiate an uncontrolled upward vertical movement that may cause the permanent magnet to lift the flywheel rotor assembly and continuously maintain the rotor at a maximum height, for example with uppermost portion 228 pressed firmly against surface region 226.

Turning to FIG. 1, based on well known practice, a touchdown arrangement 230 may be arranged in a spaced apart relationship with a lowermost portion 232 of the flywheel shaft and configured for limiting downward movement of the flywheel such that a sufficient downward movement causes the lower portion of the shaft to be received by the touchdown arrangement at a height corresponding to a maximum allowed value of the rotor-stator gap.

As noted above, with reference to FIG. 5, the rapid nonlinear increase in force responsive to decreasing gap size may introduce substantial problems and/or challenges with respect to configuring and operating the flywheel levitation apparatus, as will be described immediately hereinafter with reference to one particular example.

As one particular example, a flywheel levitation apparatus having the force profile 222 of FIG. 5 may be configured, by employing the techniques described above, such that a minimum gap size is approximately 40 mils. With this restriction in place, it is evident based on FIG. 5 that a 4000 lb. flywheel rotor assembly may be levitated in a way that at least generally avoids uncontrolled upward vertical movement due solely to the steady magnetic field. Furthermore, touchdown arrangement 230 may be configured, in accordance with the foregoing description, for limiting the downward vertical movement such that the maximum size of gap 192 is 140 mils. In this configuration, the flywheel unit is operable through a total range of gap sizes corresponding to a total allowed range of 100 mils of vertical movement. While it may be desirable to controllably levitate the flywheel rotor assembly to a particular height within this range, for example corresponding to a gap size of 90 mils, and to controllably maintain a predetermined rotor-stator gap size, at least to within a predetermined range of values that deviates from the predetermined value by, for example, substantially less than 50 mils in either the upward or downward direction, it will be appreciated by a person of ordinary skill in the art that there could be a number of reasons to provide for a total allowed range of vertical movement that exceeds the predetermined range associated with routine operation. For example, in the context of a particular flywheel unit, the given total range of movement of 100 mils may be required in order to account for considerations including but not limited (i) thermal expansion of the flywheel rotor assembly, (ii) flexure of the flywheel rotor during operation, (iii) manufacturing assembly tolerances of the rotor as well as the support structure of the flywheel unit and (iv) shock and vibration during normal operation. As will be described in greater detail hereinafter, the last of these considerations may be of particular significance, since disturbances in the form of shock and vibration tend to be inevitable under typical conditions of operation.

As noted above with reference to FIG. 5, Applicant appreciates that the rapid nonlinear increase in steady force 204 may introduce substantial problems and/or challenges with respect to configuring and operating the flywheel levitation apparatus, as will be described immediately hereinafter.

Referring to FIGS. 1 and 3, in conjunction with FIG. 5, it is evident that with a minimum gap size of 40 mils, and a total range of vertical movement of 100 mils, the maximum gap size will be at least approximately 140 mils. Based on FIG. 5, for a gap size of 140 mils, steady upward force 204 due to the steady magnetic field, produced by the permanent magnet arrangement, is approximately 1800 lbs and is thus substantially less than the entire weight of the flywheel rotor assembly. It is therefore evident that in order to fully levitate the 4000 pound rotor off of the touchdown bearings, for example during initial start up of the flywheel unit, or in the event that a disturbance causes a touchdown of the flywheel rotor assembly, it may be necessary to provide sufficient variable current through coil 180 to cause the variable magnetic field to produce over 2000 pounds of force as upward variable force 206. Furthermore, Applicant appreciates that if the coil is unable to contribute over 2000 pounds of upward variable force, then during the course of normal operation a given disturbance, such as an externally induced vibration of the flywheel housing, may cause the flywheel to drop in an uncontrolled downward vertical movement whereupon the coil is unable to controllably prevent the drop.

Applicants appreciate that it may be challenging, at least for a number of practical reasons, to configure the stator of the levitation apparatus for providing a variable magnetic field of such a magnitude as just described. In this regard, there are a number of practical challenges associated with configuring a flywheel levitation apparatus for producing a high variable upward force. As one example of a practical challenge, the coil may be required to receive a high current for producing thousands of pounds of lifting force. Resulting resistive losses may produce overheating unless some form of external cooling is applied to the coil. As another example, configurations that satisfy excessive requirements for variable upward lifting force may require correspondingly excessive physical bulk in the levitation apparatus, possibly including a large radius. Applicants appreciate that this latter concern may be of paramount significance at least for the reason that radial stresses in a rotor of large radius may be excessive at high speeds, and there may be a need to limit the outer diameter of the rotor. Based at least on the foregoing points, a person of ordinary skill in the art will readily appreciate that a requirement for a large upward variable force may introduce substantial challenges with regard to configuring a levitation apparatus for levitating a given flywheel.

Summarizing with respect to the above example, a conventional flywheel levitation apparatus may be configured to provide a steady magnetic flux 182, produced by a permanent magnet, to produce steady force 204 in accordance with the plot of FIG. 5, and vertical movement of the flywheel apparatus may be limited to a predetermined total range of vertical movement (for example 100 mils) corresponding to a minimum gap size (for example 40 mils) and a maximum gap size (for example 140 mils). While current may be applied to the coil to levitate a heavy flywheel at some predetermined gap size, the rapid nonlinear increase in force 204 may lead to the aforedescribed requirement that the stator provide a variable electromagnetic field capable of lifting a significant fraction of the total weight of the flywheel rotor at least for certain positions in the total allowed vertical movement of the flywheel rotor. Applicants appreciate that it may be impractical to provide a levitation apparatus capable of providing a variable magnetic field for lifting a large portion of the total weight of a flywheel, at least for the reasons that a levitation apparatus satisfying these requirements may require an excessively large overall size including a large rotor plate, and for a given configuration the coil may be excessively prone to overheating. Based at least on the foregoing concerns which Applicant now recognizes with respect to the prior art, Applicant further recognizes that the prior art has failed to recognize, much less resolve the concerns and related problems that have been brought to light with respect to a flywheel levitation apparatus that overcomes these challenges.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

Generally, a flywheel levitation apparatus and associated method are described for use in a flywheel driven power storage system. In one aspect of the disclosure, the apparatus can include a rotor having a rotor face, that faces upward in a vertical direction, and an axis of rotation that is at least approximately aligned with the vertical direction. The rotor is supported for (i) rotation around the axis and (ii) a limited amount of vertical movement along the axis that is sufficient to provide for levitating the rotor. A stator assembly is configured to receive a variable electrical current and to generate a variable magnetic flux therefrom which varies responsive to changes in the variable electrical current. At least one pole piece is supported by the stator and has a projecting section, extending downward toward the rotor face, for channeling the variable magnetic flux toward the rotor to exert a variable magnetic lifting force upon the rotor upward and in the vertical direction such that the variable magnetic lifting force at least provides a component of a total lifting force to influence the vertical movement. The rotor face defines a cutaway section such that the projecting section is at least partially receivable in the cutaway section responsive to an upward vertical movement of the rotor along the axis of rotation, and the variable magnetic lifting force exhibits a modified gap sensitivity that is smaller as compared to a conventional gap sensitivity that would be exhibited in an absence of the cutaway section.

In another aspect of the disclosure, a method is described for levitating a flywheel in a flywheel driven power storage system. The method includes providing a rotor having an axis of rotation and aligning the axis of the rotor at least approximately along the vertical direction. The rotor is supported for rotation about the axis and to permit a limited amount of vertical movement along the axis to provide for levitation of the rotor. A stator assembly is configured for receiving an electrical current and for generating a magnetic flux therefrom, and to include at least one pole piece, the pole piece having a projecting section. The pole piece is aligned for receiving the magnetic flux and for channeling the magnetic flux toward the rotor for exerting a magnetic lifting force upon the rotor, upward and in the vertical direction, to influence the vertical movement. The rotor face is formed to define a cutaway section for at least partially receiving the projecting section of the pole piece in the cutaway section, responsive to the vertical movement of the rotor along the axis of rotation, such that the magnetic lifting force exhibits a gap sensitivity that is smaller as compared to a gap sensitivity that would otherwise be exhibited in an absence of the cutaway section.

In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION

Figure 1:
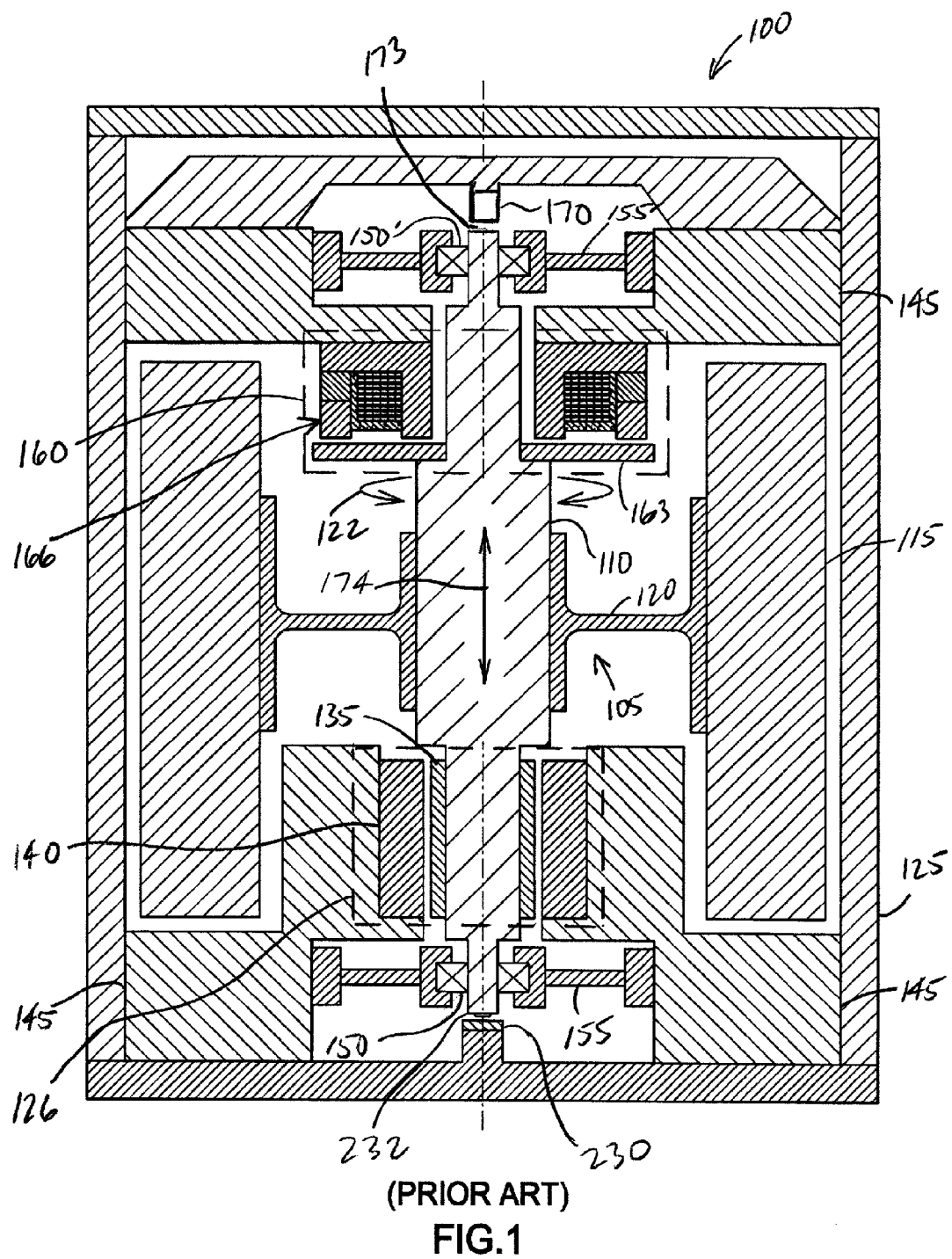
FIG. 1 is a diagrammatic cross-sectional view, in elevation, of a prior art electromechanical flywheel unit.
Figure 2:
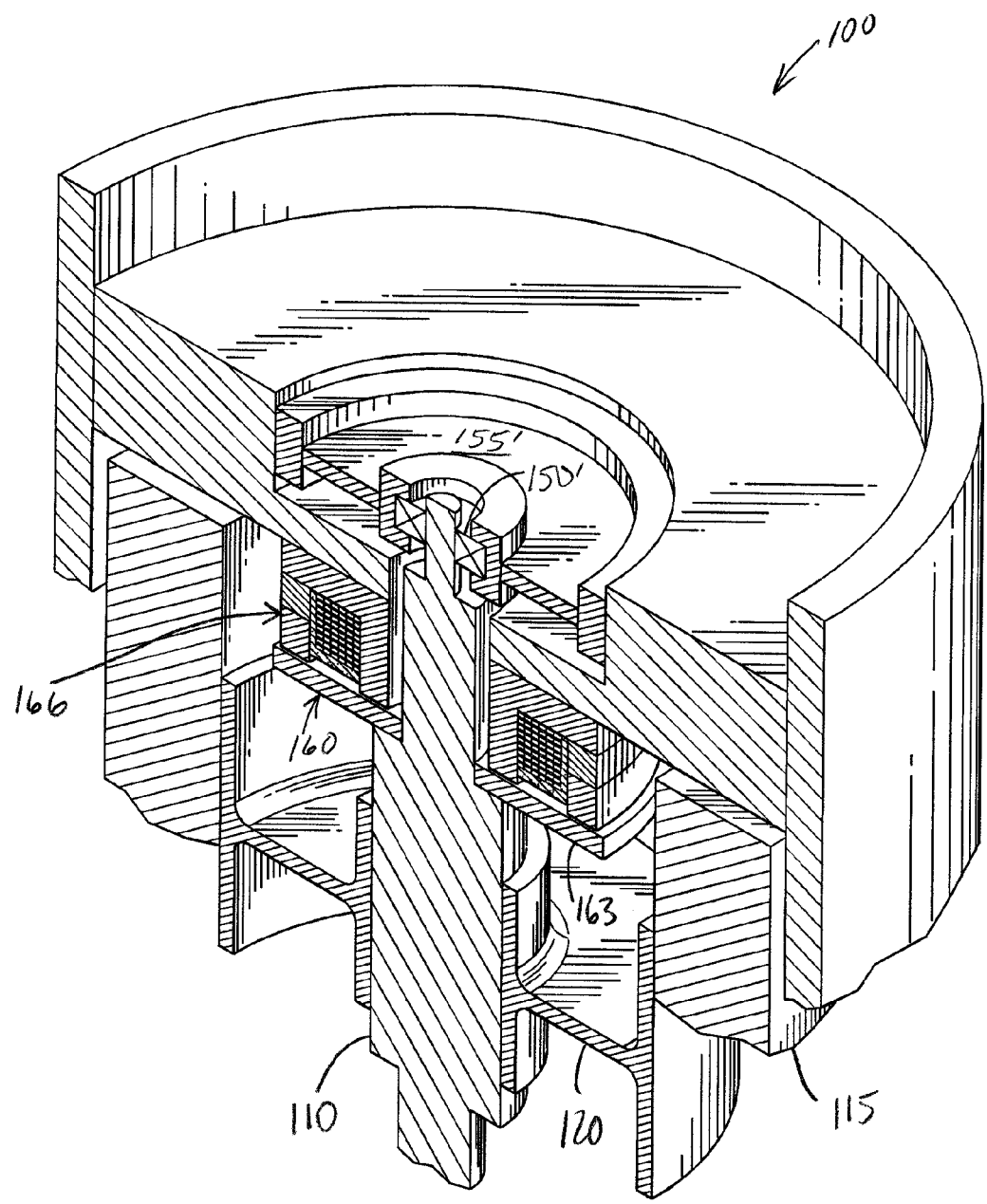
FIG. 2 is a diagrammatic enlarged partially cut-away perspective view of one portion of the prior art flywheel unit of FIG. 1.
Figure 3:
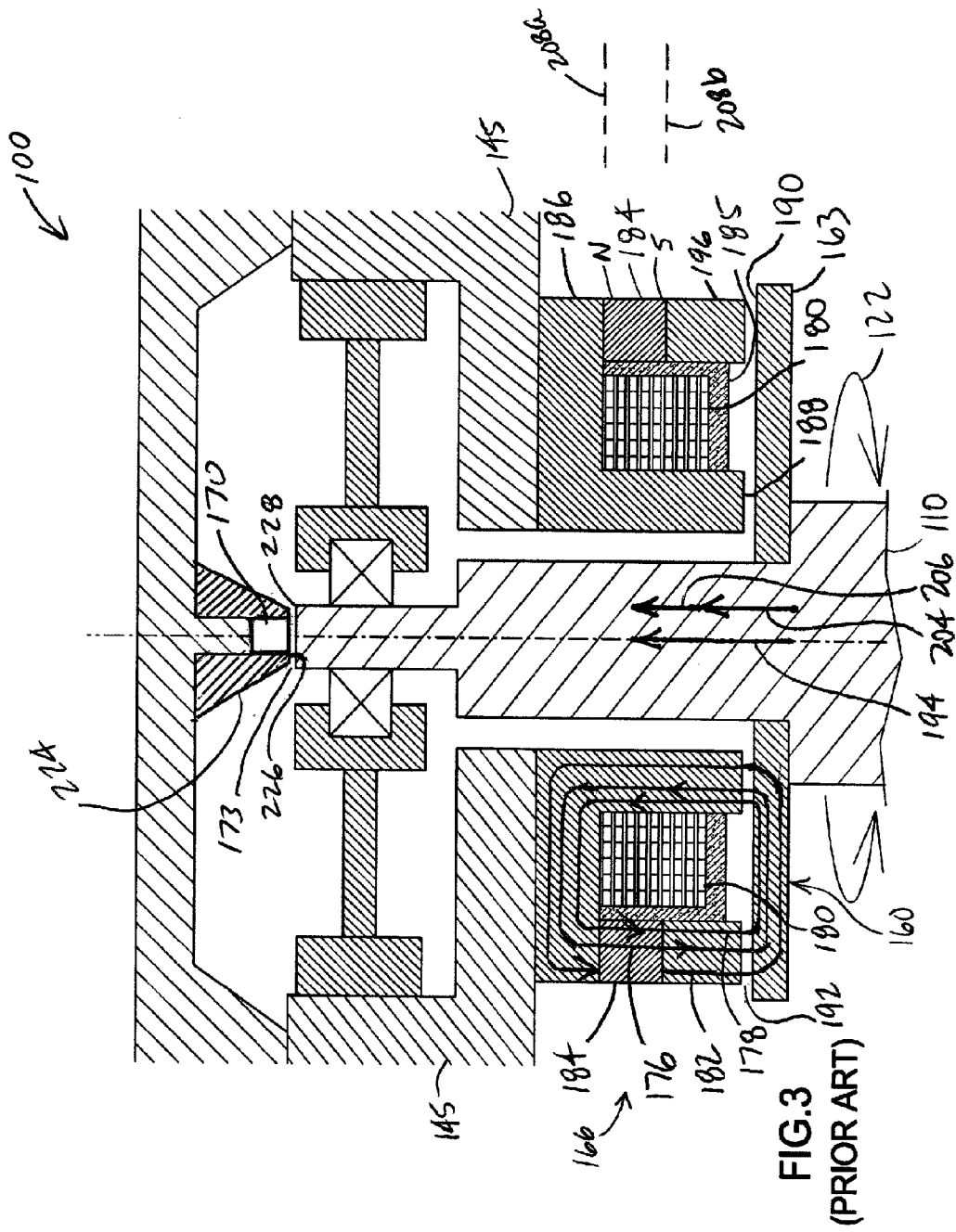
FIG. 3 is a partial diagrammatic cutaway view, in elevation, of another portion of the prior art flywheel unit of FIG. 1, shown here to illustrate details of its levitation control stator and rotor.
Figure 4:
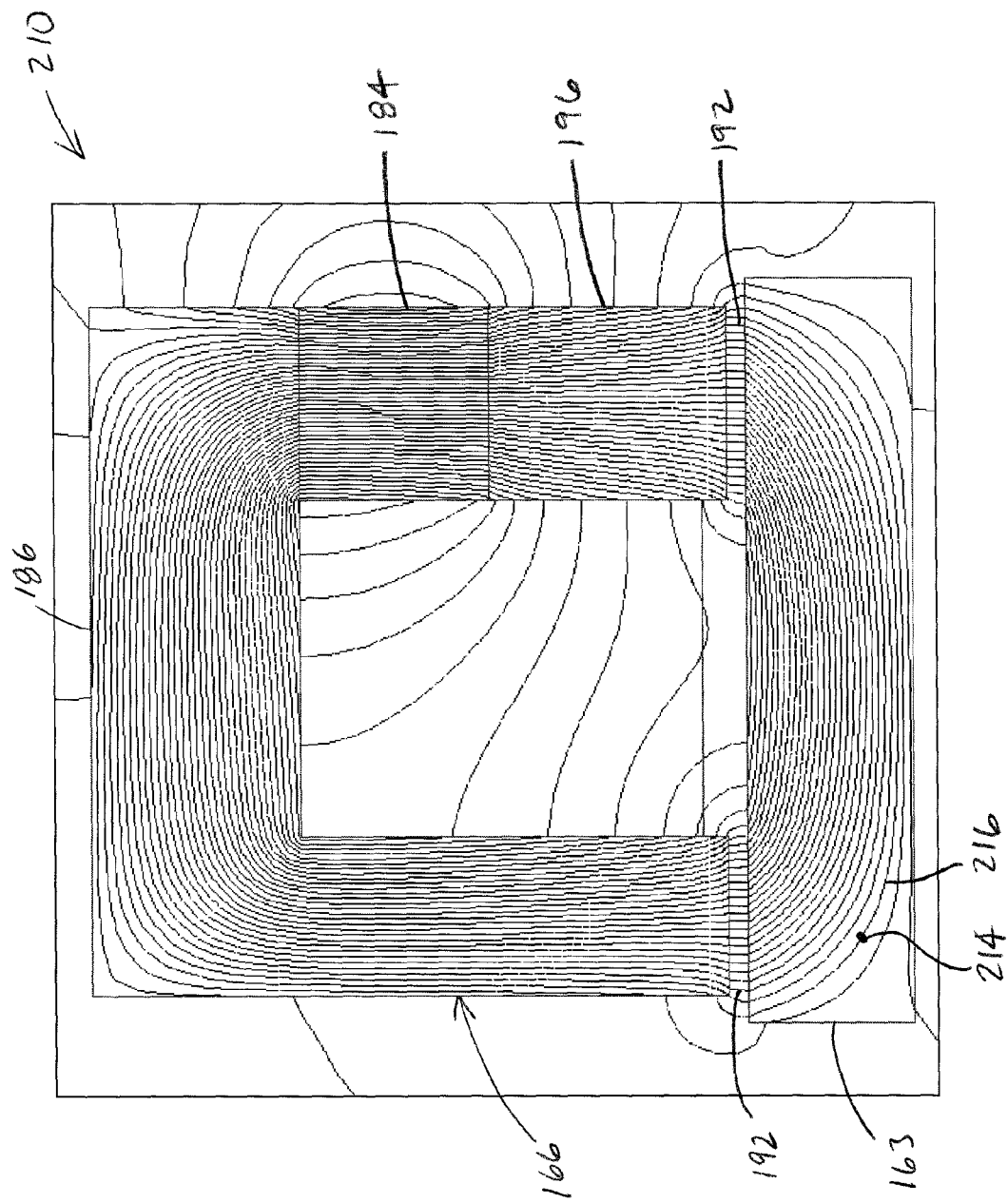
FIG. 4 is a diagrammatic magnetic field map showing magnetic field lines as they can appear based on mathematical simulation in the stator and rotor of the prior art flywheel unit of FIG. 1.

The following description is presented to enable one of ordinary skill in the art to make and use the invention and is provided in the context of a patent application and its requirements. Various modifications to the described embodiments will be readily apparent to those skilled in the art and the generic principles taught herein may be applied to other embodiments. Thus, the present invention is not intended to be limited to the embodiment shown, but is to be accorded the widest scope consistent with the principles and features described herein including modifications and equivalents, as defined within the scope of the appended claims. It is noted that the drawings are not to scale and are diagrammatic in nature in a way that is thought to best illustrate features of interest, for example, by exaggerating the appearance and/or size of features of interest relative to other features. Descriptive terminology such as, for example, upper/lower, uppermost/lowermost, vertically/horizontally, left/right and the like may be adopted for purposes of enhancing the reader's understanding, with respect to the various views provided in the figures, and is in no way intended as being limiting.

As described immediately above, a conventional flywheel levitation apparatus configured for levitating the entire weight of a heavy flywheel rotor, over a total range of vertical movement corresponding to a corresponding total range of rotor-stator gap sizes, may provide a steady magnetic field, for example due to a permanent magnet, that applies a steady upward force exhibiting a rapid and nonlinear increase for decreasing values of the rotor-stator gap. As will be described in greater detail hereinafter, this rapid and nonlinear increase, combined with a requirement to at least generally avoid uncontrolled upward and/or downward vertical movement, tends to at least exacerbate the substantial challenges that can be associated with configuring a levitation apparatus for levitating a flywheel rotor in controlled way. In particular, for a flywheel unit having a heavy rotor (for example over one thousand pounds), depending on various features of the specific flywheel unit, such as the required total range of vertical movement, it may be challenging to configure a conventional lift magnet to satisfy reasonably practical requirements, especially with regard to the coil utilized for producing the variable magnetic field. For example, a flywheel unit configured for levitating a particularly heavy rotor with a given total weight and requiring a given total range of vertical movement, may require a coil capable of generating an upward force of thousands of pounds in order to operate the flywheel over a required total range of vertical movement, while avoiding uncontrolled upward or downward movement. In order to address the challenges that have been brought to light, Applicant discloses herein a flywheel levitation apparatus having a force profile that rises more gently and in a more linear way as compared to the force profile of a conventional levitation apparatus. In this regard, a flywheel levitation apparatus according to the present disclosure produces (i) a smaller lifting force for small gap sizes, for example, from 40 mils to 85 mils on the basis of the prior art example above, as compared with a conventional levitation apparatus, and (ii) a higher lifting force for large gap sizes, for example from 110 to 140 mils on the basis of that same prior art example.

A levitation apparatus according to the present disclosure may be configured for fully levitating a given flywheel rotor assembly such that a variable upward force may be used to lift a smaller portion of the total weight of the flywheel rotor as compared to the variable force that is typically used in the prior art. Applicant further appreciates, as will be described in greater detail hereinafter, that the foregoing characteristics may provide an additional advantage that the flywheel levitation apparatus may be operable using a levitation apparatus with a smaller outside diameter capable of higher rotational speeds as compared with that of a conventional flywheel assembly, and that this smaller diameter assembly may require lower current and be correspondingly less prone to overheating.

Having described the prior art with reference to FIGS. 1-5 above, attention is now directed to the remaining figures wherein like reference numbers may be used to refer to like features and components throughout the various figures. FIG. 6 illustrates a cutaway cross-sectional plan view of a portion of a flywheel unit generally indicated by the reference number 240 and produced according to the present disclosure. Flywheel unit 240 includes a flywheel levitation apparatus 242 generally contained within a dashed rectangle. Stator 166 of the levitation apparatus includes inner pole piece 186 and outer pole piece 196 which each include projecting section 188, extending downward towards a modified rotor 244 that defines an inner annular cutaway section 246 and an outer annular cutaway section 248, each of which annular cutaway sections is configured for receiving a respective portion of the projecting sections of inner pole piece 186 and outer pole piece 196 responsive to an upward movement of the rotor at least approximately along a vertical axis 250. As will be described hereinafter, these cutaway sections can be configured to cooperate with stator 166 to provide a number of remarkable advantages, at least in comparison to the prior art configurations described in the Background Section above, including providing (i) a comparatively smaller upward steady force for small gap sizes (for example from 40 mils to 85 mils according to example above) and (ii) a comparatively higher upward steady force for large gap sizes (for example from 85 to 120 mils in that same example) and (iii) a force profile that rises more gently and in a correspondingly more linear way as compared to a conventional force profile.

Stator 166 further includes permanent magnet arrangement 184 and coil 180. Modified rotor 244 is attached to shaft 110, as part of a flywheel rotor assembly, and is supported, through this shaft, for (i) rotation about vertical axis 250 and (ii) a limited amount of vertical movement 174 along the axis that is sufficient to at least provide for levitating the rotor. The stator includes coil 180 configured to receive a variable electrical current and to generate therefrom variable magnetic flux 178 which varies responsive to changes in the variable electrical current. The inner and outer pole pieces are configured for channeling the variable magnetic flux toward the rotor to cooperate with one another to exert a variable magnetic lifting force 206 upon the rotor upward and in the vertical direction such that the variable magnetic force at least provides a component of an overall lifting force to influence vertical movement 174.

Furthermore, the stator assembly includes permanent magnet arrangement 184 that is aligned in magnetic communication with pole pieces 186 and 196 such that the permanent magnet arrangement produces steady flux 182 as part of total magnetic flux 176 that also includes variable magnetic flux 178. It is noted that steady magnetic flux 182, provided by permanent magnet arrangement 184, produces a steady component of upward force 204, which combines with variable upward force 206 as part of total upward force 194. Furthermore, based on well known principles of magnetism, it will be appreciated by a person of ordinary skill in the art that the variable magnetic flux, produced by the coil in response to the variable electrical current provided thereto and the steady magnetic flux, produced by the permanent magnet arrangement, are both channeled by the pole pieces in at least generally similar ways such that they combine to provide the total magnetic field so that this total magnetic field flows in a magnetic circuit along a path that includes inner pole piece 186, rotor 244 and outer pole piece 196.

Figure 7A:
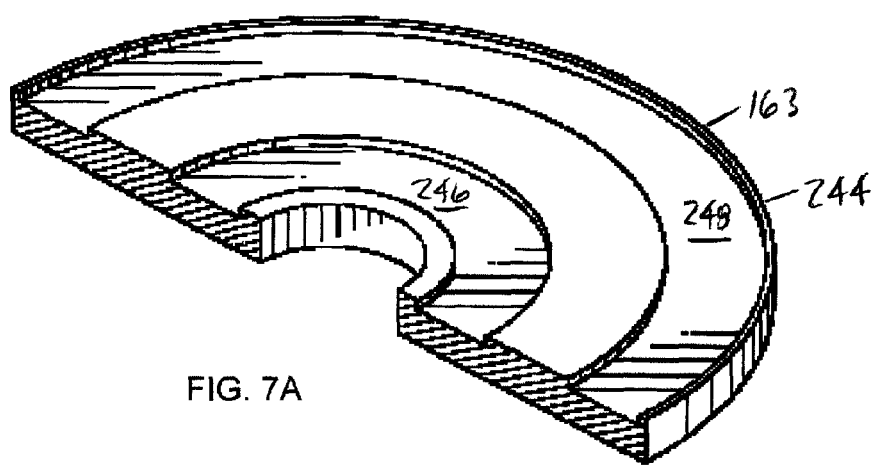
FIG. 7A is a partially cutaway view, in perspective, of the modified rotor used in the flywheel unit of FIG. 6.

Having described a number of features of flywheel levitation apparatus 242, attention is now directed to FIG. 7A which is a perspective cutaway view of a portion of modified rotor 244. FIG. 7 is included for purposes of clarity at least to explicitly illustrate the annular configuration of inner and outer cutaway sections 246 and 248, respectively.

Figure 7B:
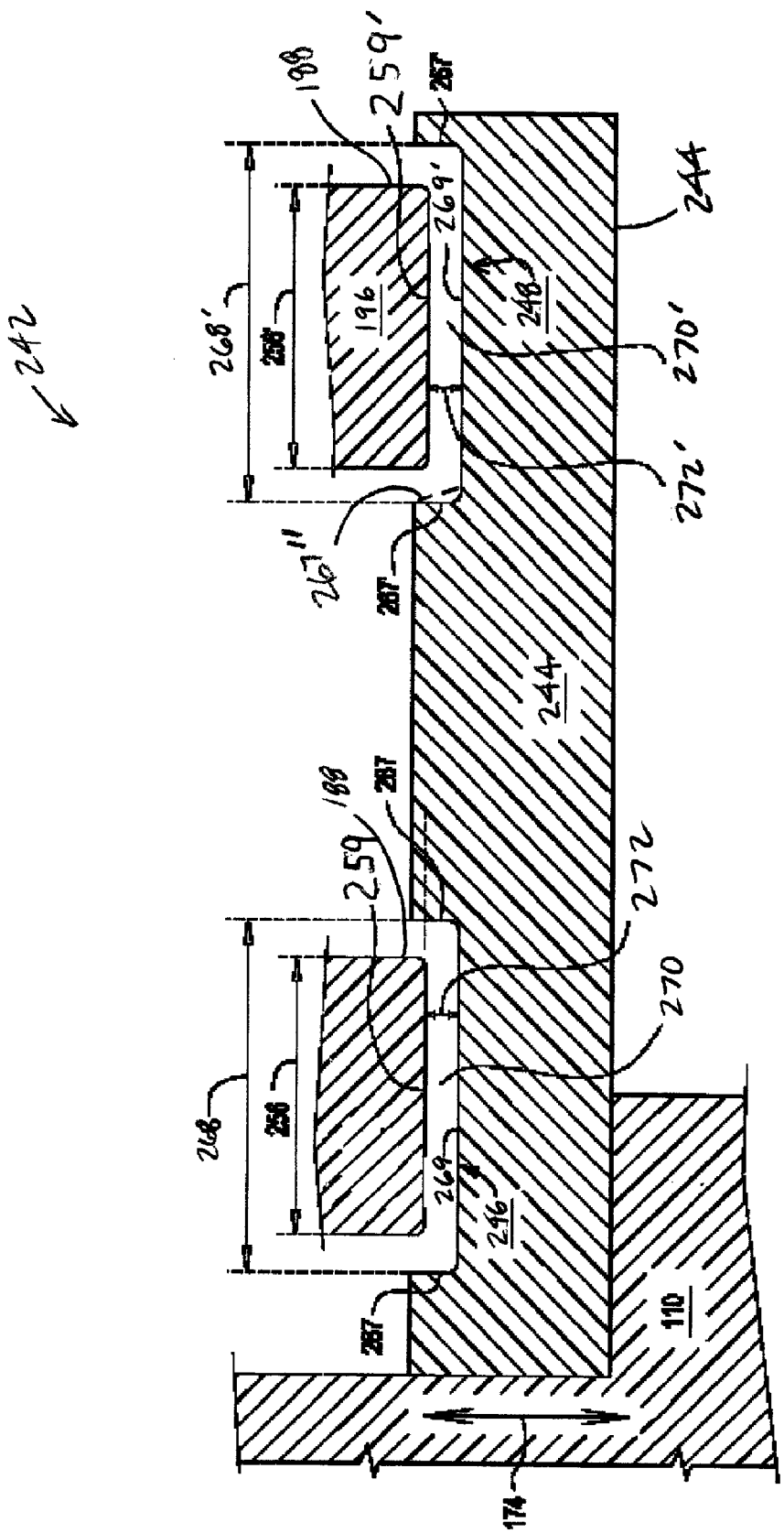
FIG. 7B is a partial diagrammatic view, in cross-sectional elevation, showing a portion of the levitation arrangement that forms part of the flywheel unit of FIG. 6.

Attention is now turned to FIG. 7B, which is a diagrammatic cross-sectional view illustrating further details of flywheel levitation apparatus 242. Projecting section 188 of the inner pole piece may be in the form of a cylindrical member having a cylinder wall with a wall thickness 256. Corresponding inner projecting section 188 may include a lower surface 259 facing downward toward the rotor. Inner cutaway section 246 may be in the form of a slot that is widthwise delimited by a pair of sidewalls 267 to define an inner slot width 268 that is sufficient for receiving this wall thickness. The cutaway section may have a floor 269 that faces upward in a confronting relationship with lower surface 259 to define a gap 270 having a gap size 272, as indicated.

Similarly, projecting section 188 of outer pole piece 196 may have a similar cylindrical shape with a wall thickness 256', and this outer projecting section may include an additional lower surface 259' facing downward toward the rotor. The outer cutaway section may be in the form of a slot that is widthwise delimited by another pair of sidewalls 267' to define an outer slot width 268' that is sufficient for receiving the cylindrical wall thickness of the end portion of the outer pole piece. The outer cutaway section may have an additional floor 269' that faces upward in a confronting relationship with additional lower surface 259' to define an additional gap 270' having an additional gap size 272', as indicated.

As illustrated in FIG. 7B, the pole pieces are vertically aligned with the cutaway sections such that the pole pieces are at least partially receivable, responsive to vertical movement 174 of the rotor. By way of non-limiting example, it will be assumed hereinafter that a given flywheel levitation apparatus is configured such that additional gap size 270' has at least approximately the same as value as gap size 270 over the total range of vertical movement 174. While this relationship is at least approximately maintained in Applicant's present embodiments, it is noted that there is no requirement that this should be the case. In one embodiment, sidewalls 267' are at least generally vertically oriented. In another embodiment, a sidewall 267", shown in phantom using a dashed line, can be sloped or chamfered such that the lower region of the cutaway portion is narrowed but nevertheless sufficiently wide to receive the pole piece, as desired. One or both sidewalls can be sloped or chamfered in such a manner. With regard to the configuration of such sidewalls, it should be appreciated that any suitable profile may be used provided that the rotor functions in a manner that is consistent with this overall disclosure in cooperation with the pole pieces. Accordingly, the configurations that are given herein are illustrative rather than limiting.

Figure 5:
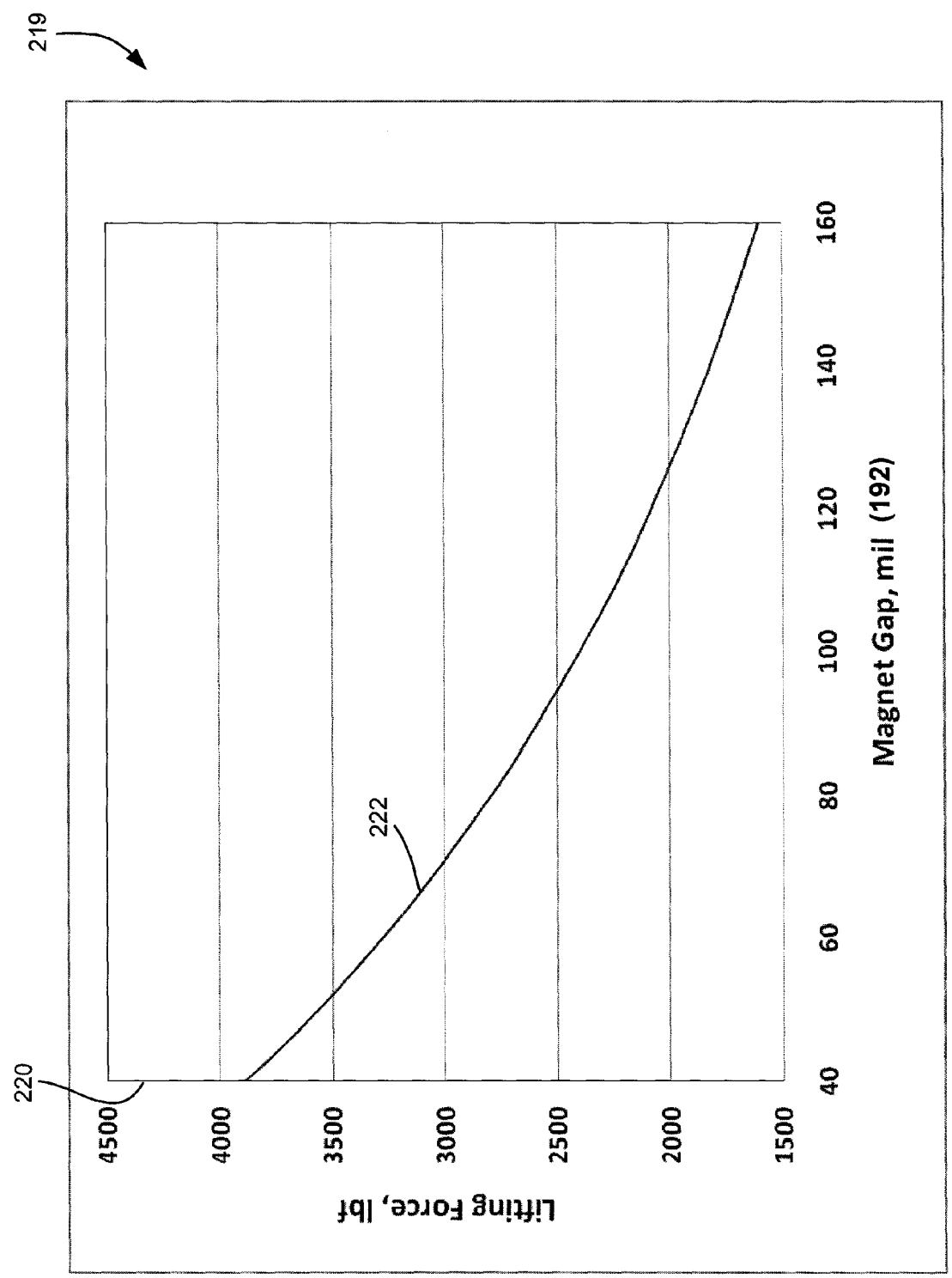
FIG. 5 is a plot of lift force versus stator-rotor gap for the prior art flywheel unit of FIG. 1.
Figure 6:
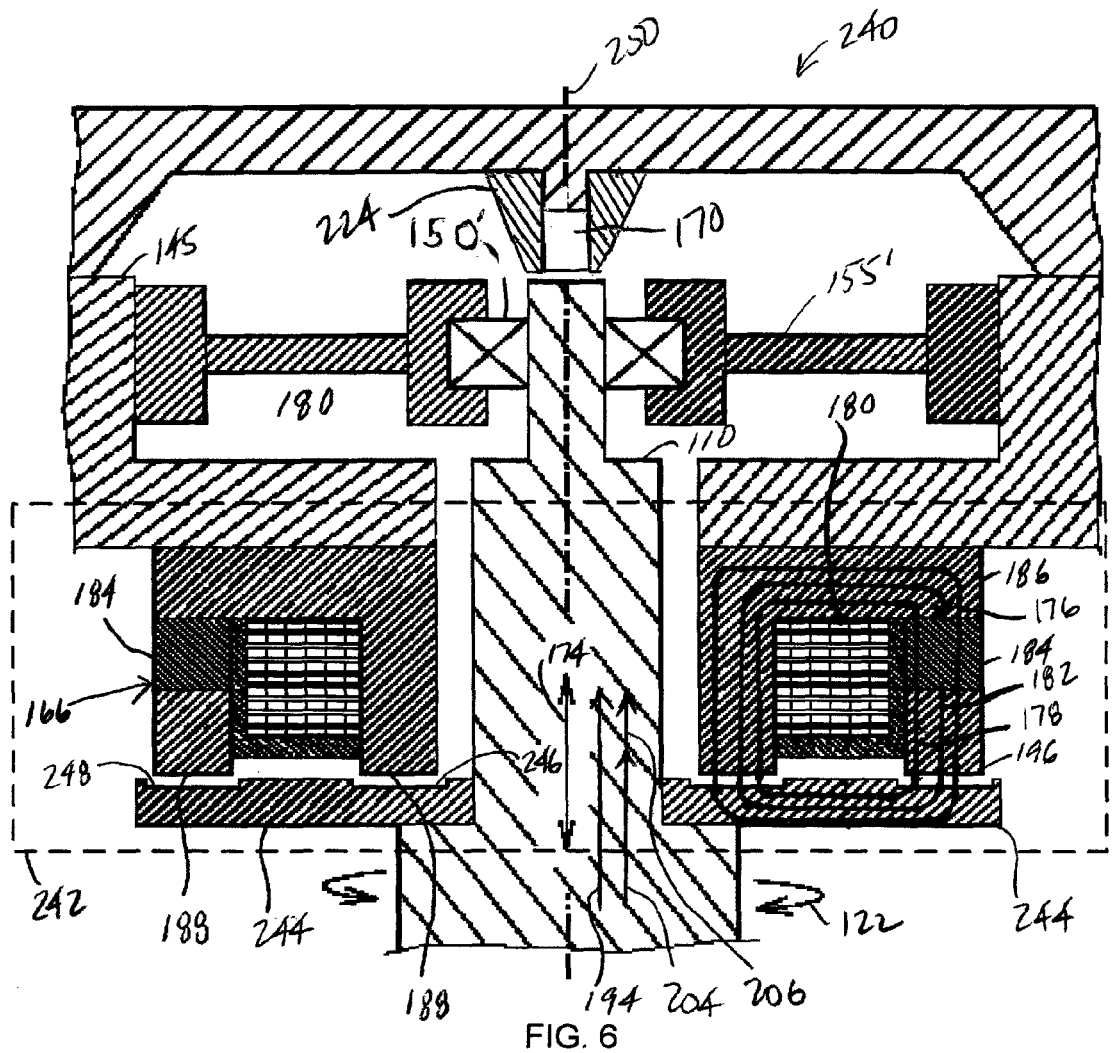
FIG. 6 is a partial diagrammatic view, in cross-sectional elevation, of a flywheel unit produced according to the present disclosure including a modified rotor among other modifications.
Figure 8:
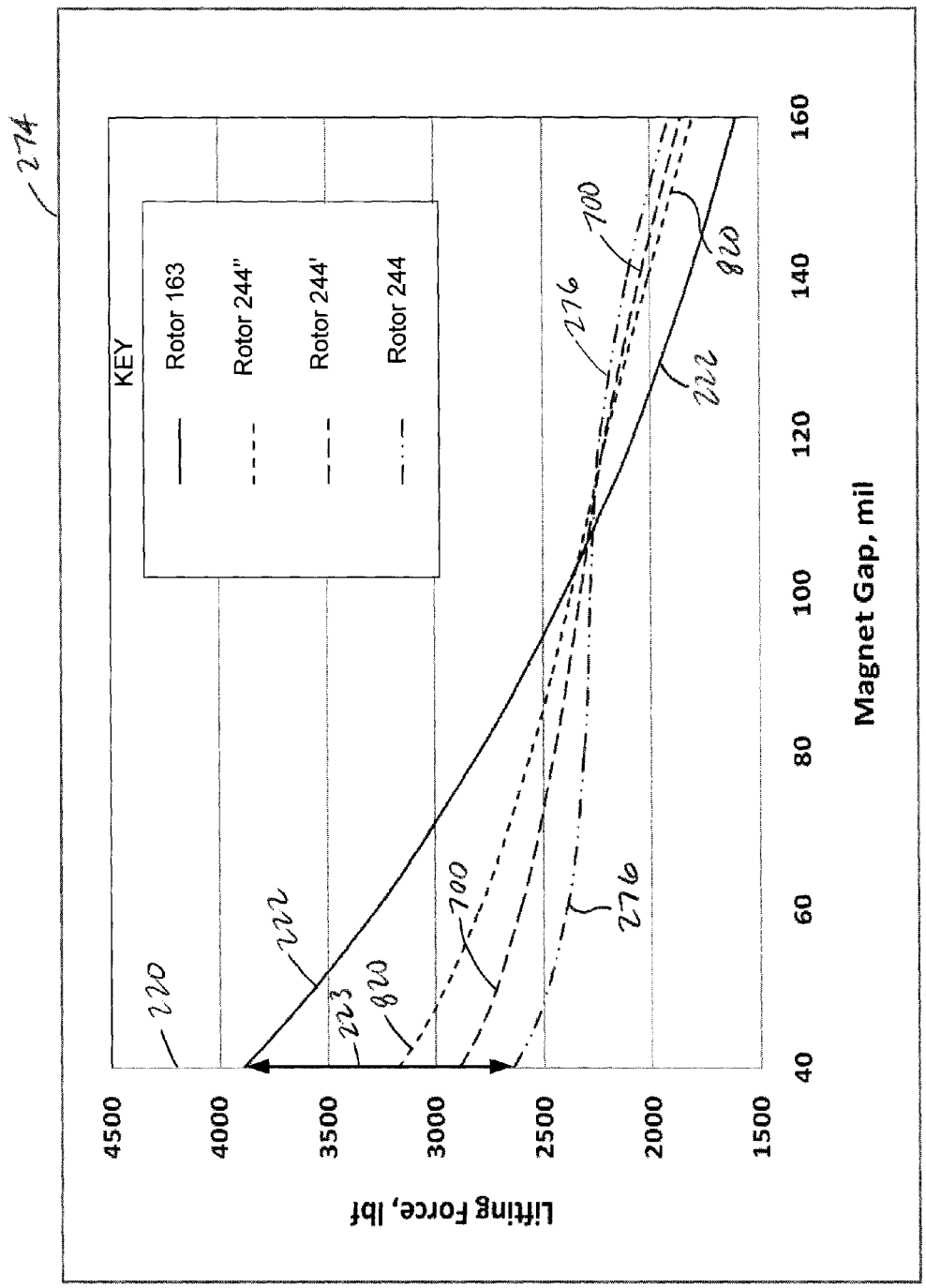
FIG. 8 is a plot of lift force versus stator-rotor gap, shown here to illustrate differences between a conventional levitation unit and a number of units that are produced according to the present disclosure.

Attention is now turned to FIG. 8 which is a plot, generally indicated by reference number 274 having vertical axis 220 and a horizontal axis representing gap size, as in previously described FIG. 5. For purposes of comparison, plot 274 repeats force profile 222 of FIG. 5, resulting from the permanent magnet arrangement of conventional levitation apparatus 160 shown in FIGS. 1-4.

FIG. 8 further illustrates a force profile 276 computed using ANSYS®, in accordance with the well-known computational techniques described above with reference to FIGS. 5 and 6, for one embodiment of flywheel apparatus 240. In particular, force profile 276 corresponds to steady upward force 204 produced by permanent magnet arrangement 184. As illustrated in FIG. 8, for a range of small gap sizes (for example between 40 and 100 mils) the lift force in force profile 276 for flywheel levitation apparatus 242 exhibits a lower steady lift force, as compared to force profile 222 for conventional flywheel levitation apparatus 160, and at a gap size of 40 mils a remarkable difference 223 of about 1250 lbs of force is observed. For a range of large gap sizes (for example, between 120 and 160 mils) flywheel levitation apparatus 242 exhibits a higher steady lifting force, as is evident by comparing force profile 276 with force profile 222. As will be described immediately hereinafter, force profile 276 arises at least in part as a result of redirection of magnetic flux due to a number of features of the inner and outer cutaway sections. It should be appreciated that gap sensitivity in the context of FIG. 8 is directly proportional to the slope of the curve at any given point. That is, decreasing slope corresponds to reducing gap sensitivity.

Figure 9:
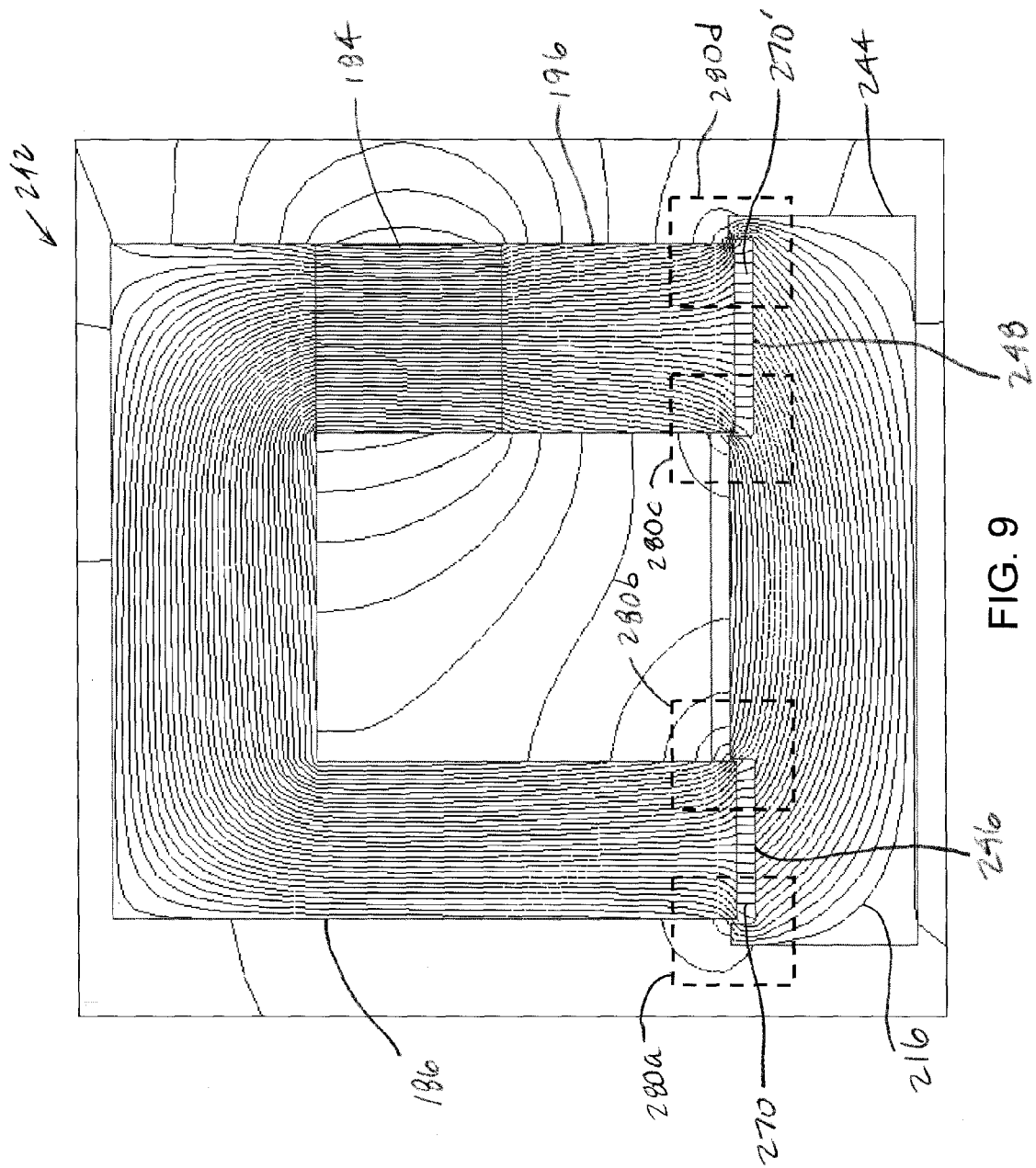
FIG. 9 is a diagrammatic magnetic map showing magnetic field lines as they can appear in the levitation apparatus of the flywheel unit of FIG. 6 during its operation and illustrating a number of areas of particular interest with respect to the appearance of the magnetic field.

Attention is now turned to FIG. 9, which is a diagrammatic representation of a magnetic field line map associated with flywheel levitation apparatus 242, produced based on well known techniques, as described previously with respect to FIG. 4, using commercially available ANSYS® as FEA software. As indicated in FIG. 9, the geometrical shapes of inner pole piece 186, outer pole piece 196, permanent magnet 184 and rotor 244, are diagrammatically represented in FIG. 9 in a way that is at least generally consistent with their corresponding appearance in FIG. 6 with magnetic field lines 216 superposed over these geometrical shapes representing the magnitude and orientation of magnetic flux in and around these components. Comparing FIG. 9 with FIG. 4 reveals that, for the most part, the flux is quite similar in the pole pieces, the magnet and the rotor. It is noted, however, that certain groups 280*a-d* of field lines 216, indicated in FIG. 9 within dashed boxes and associated with selected features of the pole pieces and the cutaway sections, differ substantially from their appearance in FIG. 4, as do the field lines present in gaps 270 and 270'. It is noted that field line groups 280*a-d* may be referred to collectively by the reference number 280.

Applicant appreciates that the differing appearance of groups 280 of field lines 216, indicated within dashed rectangles, may be at least generally indicative of significant differences in the force profile exhibited by levitation apparatus 242 as compared to that of conventional levitation apparatus 160. Accordingly, the force profiles illustrated in FIG. 8 were generated based on such flux plots. It is noted that force profile 276 is representative of one embodiment of a flywheel unit that has been reduced to practice.

Figure 10:
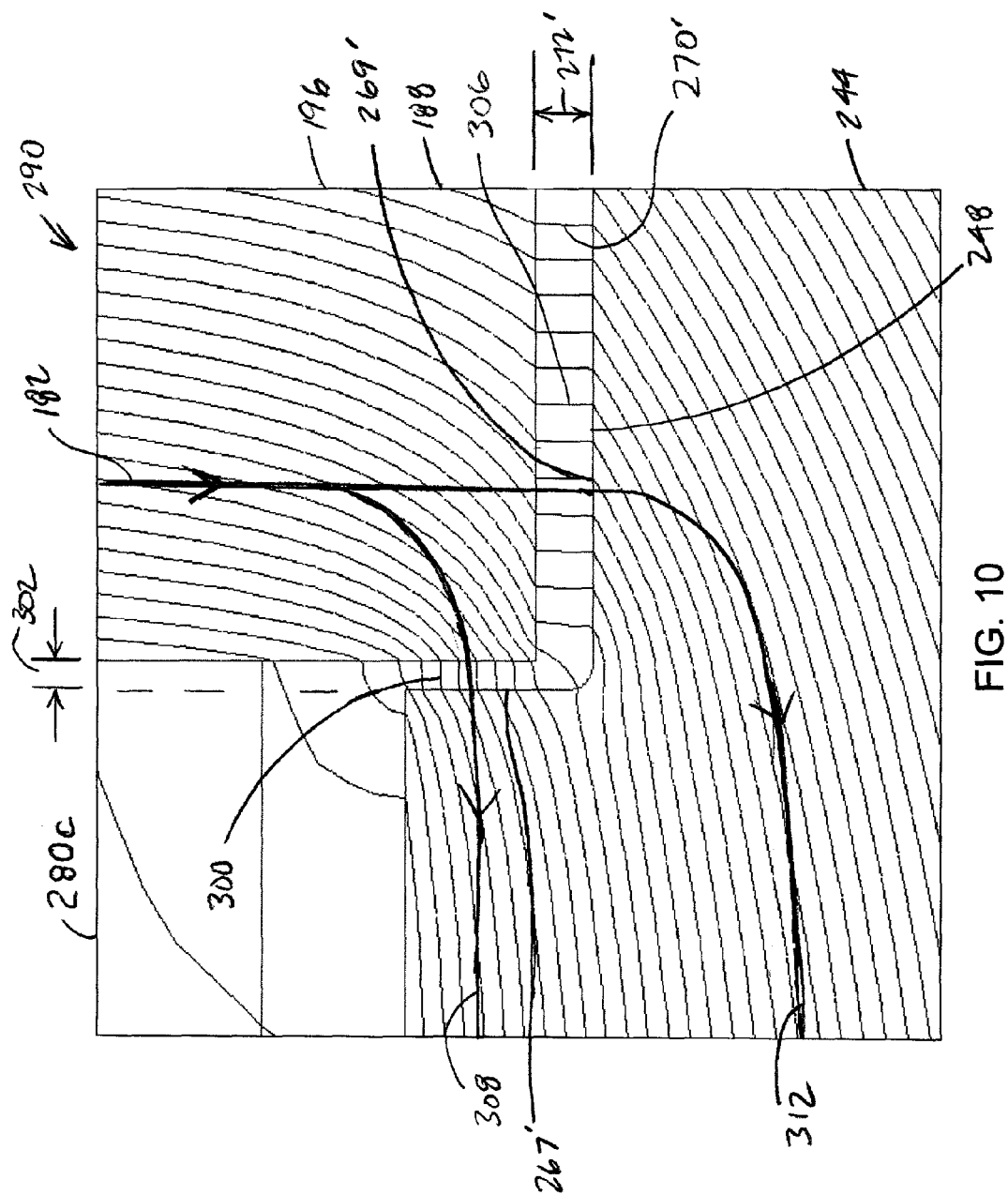
FIG. 10 is a further enlarged diagrammatic magnetic map corresponding to one region of interest in the magnetic map of FIG. 9, shown here to illustrate the appearance of the field with the levitation apparatus operating in a small gap configuration/mode.

Attention is now directed to FIG. 10 in conjunction with FIG. 9, the former of which is a further enlarged illustration of one portion of the magnetic field map of FIG. 9, generally indicated by the reference number 290. The magnified view of FIG. 10 is presented so that the reader is able to discern various influences on the field in this region in the context of the discussions which follow. In particular, the view of FIG. 10 is associated with the appearance of field line group 280*c* of field lines 216 in FIG. 9 proximate to an inner corner of the outer pole piece. Group 280*c* of magnetic field lines is superposed over corresponding shapes for representing the magnitude and orientation of magnetic flux in and around these magnetic components. These features include gap 270' having gap size 272', projecting section 188 of outer pole piece 196, one sidewall 267' of outer cutaway section 248 and its cutaway floor 269'.

As described previously, the levitation apparatus is operable in each one of (i) a large gap configuration corresponding to a large gap size, and (ii) a small gap configuration corresponding to a small gap size. It is to be understood that FIG. 10 corresponds to the small gap mode and represents a selected one of a range of small gap sizes (for example between 40 and 80 mils) for which flywheel apparatus 240 advantageously exhibits a lower small-gap steady upward force, as compared to conventional flywheel apparatus 160.

Still referring to FIG. 10, attention is directed to a group of field lines 300, only one of which is specifically designated, that are diverted to sidewall 267' of the rotor from projecting section 188 of the outer pole piece. It is noted that projecting section 188 is aligned with respect to sidewall 267' to define a radial gap 302 having a radial width that is sufficiently small such that a substantial quantity of magnetic flux is redirected to cause field lines 300 to exhibit a radial-gap intensity that is at least generally comparable with the rotor-stator gap intensity exhibited by vertically oriented field lines 306, only one of which is specifically designated, associated with rotor-stator gap 272'. At least for some small gap sizes, the magnetic flux intensity in radial gap 302 may exceed the magnetic flux intensity in gap 272'. Based in part on inspection of FIG. 10 in conjunction with additional analysis and in comparison with corresponding groups of field lines associated with conventional rotor-stator combinations, Applicant believes that redirected field lines 300 at least contribute to the substantial differences in the performance of flywheel levitation apparatus 240, in the small gap configuration, as compared to a conventional levitation apparatus having no cutaway sections. In particular, based at least in part on field map 290, it is apparent that redirected field lines 300 may be interpreted as being representative of a redirected magnetic flux 308 that is split away from steady magnetic flux 182 such that the intensity of steady magnetic flux 182 is diminished in gap 272' responsive to a reduced remaining portion 312 of the flux which passes through gap 272' to cause a reduction in the upward steady force for some small gap sizes.

Figure 11:
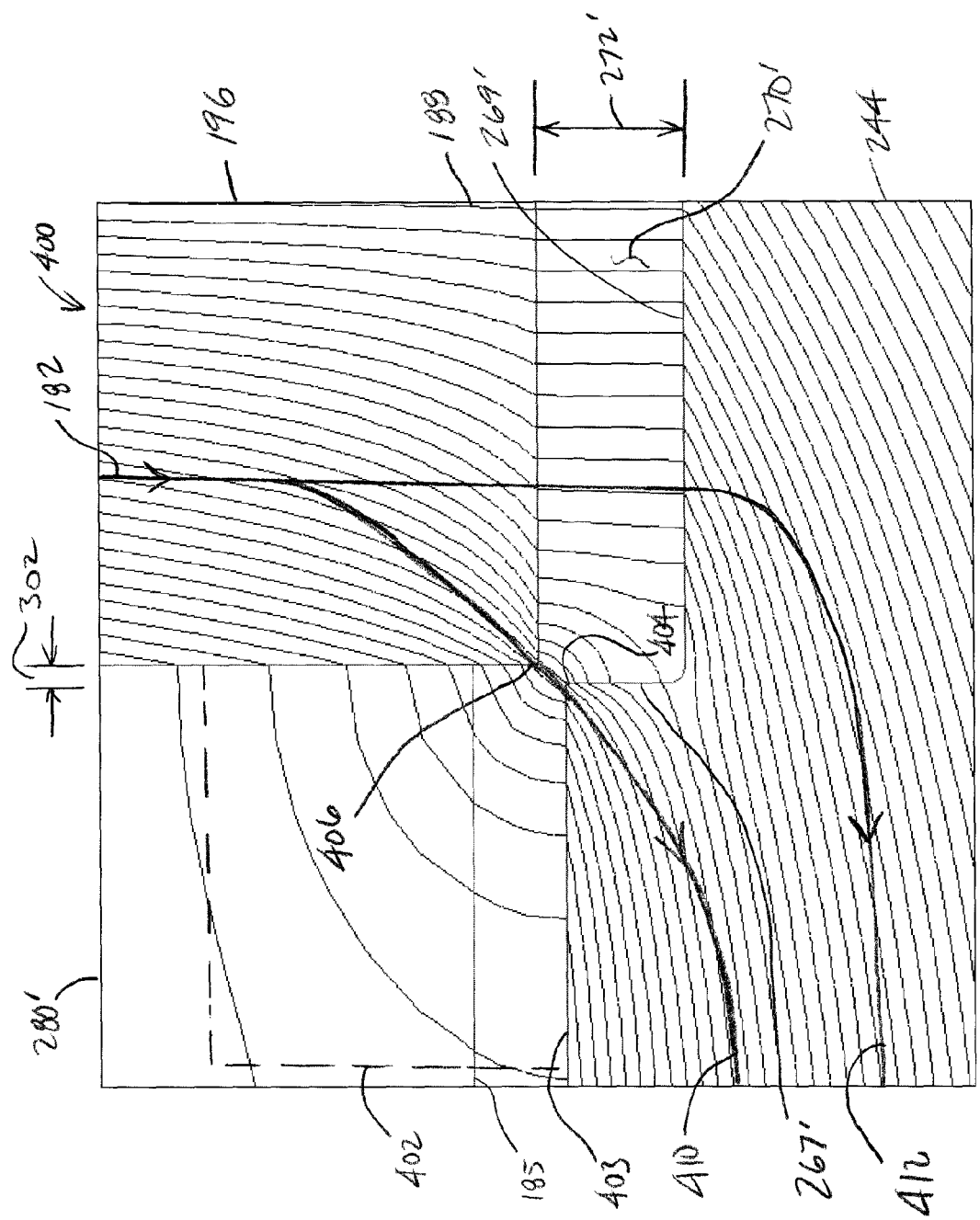
FIG. 11 is another further enlarged diagrammatic magnetic map corresponding to the region of interest in the magnetic map of FIG. 11, but here showing the appearance of the field with the levitation apparatus operating in a large gap configuration/mode.

Attention is now directed to FIG. 11 in conjunction with FIGS. 9 and 10. FIG. 11 illustrates a magnetic field map generally indicated by reference number 400, associated with field lines 280*c* of FIG. 9 but with a different, larger size for gap 272' than the gap size shown in FIG. 10. A number of features are diagrammatically represented in FIG. 11 in the same manner presented in FIG. 10, including gap 270' having gap size 272', projecting section 188 of outer pole piece 196, sidewall 267' and floor 269' of the outer cutaway section. It is noted that field map 400 of FIG. 11 corresponds to a selected size in a range of large gap sizes (for example between 120 and 160 mils) for which flywheel levitation apparatus 242 advantageously exhibits a higher large-gap steady upward force, as compared to conventional flywheel levitation apparatus 160 operated at the same large gap size.

With primary reference to FIG. 11, attention is directed to a particular large-gap subset of field lines 402, generally shown within a region bounded at the left and top by dashed lines and bounded at the right by one sidewall of the pole piece and at the bottom by a major surface 403 of the rotor. Within region 402, the flux lines are diverted at least generally towards and responsive to a peripheral edge/corner 404 of the rotor from an edge/corner 406 of projecting section 188 of the pole piece. As described above with reference to FIG. 10, projecting section 188 of the outer pole piece is aligned with sidewall 267' to define radial gap 302 having a radial width being sufficiently small such that a substantial amount of magnetic flux is redirected from the pole piece towards peripheral edge 404, and that the redirected flux represented by field lines 402 exhibits a radial-gap intensity that is at least comparable with and may exceed the intensity of the magnetic flux associated with rotor-stator gap 272', as represented by the field lines. Applicant recognizes that large gap subset of field lines 402 exhibits a substantial vertical orientation component generally within some radius of corners 404 and 406, and that this component gives rise to an edge-enhanced component of the steady upward force. Based in part on these recognitions, Applicant believes that redirected field lines 402 at least contribute to the substantial differences in the performance of flywheel levitation apparatus 242, in the large gap configuration, as compared to levitation apparatus 160 of the prior art. In the large gap configuration, a diverted portion 410 of total flux 182 combines with a remaining portion 412 of the flux to enhance the levitation force in the small gap mode. Thus, rotor 244 causes sufficient reorientation of flux in the small gap mode versus the large gap mode to provide heretofore unseen, remarkable benefits with respect to decreasing the relative levitation force in the small gap mode while enhancing the relative levitation force in the large gap mode. It should be appreciated that a similar behavior of the flux in the small and large gap modes is presented by each of regions 280 as represented by FIGS. 10 and 11. Thus, each of these regions contributes to the advantageous behavior of flywheel levitation apparatus 242.

It is again noted that the field lines illustrated in FIGS. 9-11 have been computed based on contributions of the permanent magnet arrangement, and therefore represent the steady magnetic field. These field lines do not explicitly include any contribution of variable magnetic field provided through the coil responsive to variable magnetic current. However, it is to be understood that the pole pieces will tend to channel the variable magnetic field, produced by the variable current through the coil, in substantially the same way that the pole pieces channel the steady magnetic field produced by the permanent magnet. While field lines representing variable magnetic flux, in regions with close proximity to the coil, may differ substantially as compared to field lines in those same regions representing steady flux, it can be appreciated, based on well known principles of magnetism, that field lines in the projecting sections will be similar regardless of whether they were produced by the coil or by the permanent magnet. Therefore, the magnetic field lines in and around rotor-stator gaps 270 and 270' tend to exhibit at least approximately similar spatial distributions and directional orientations, for the variable and for the steady magnetic fields, even while the respective magnitudes of the variable and steady magnetic fields may be very different. In this regard, FIG. 10 and FIG. 11 can be relied upon as at least approximately illustrating appropriately scaled field lines associated with the variable magnetic flux. Therefore, the influence of the various geometric features upon the variable magnetic flux upon can be expected to influence the variable upward force in a way that is directly analogous to their influence upon the steady upward force.

For example, in the small gap configuration, the pole pieces of the stator can be expected to cooperate with the sidewalls of the rotor to produce the diverted flux, from the variable magnetic flux, in accordance with the descriptions immediately above. Furthermore, subset of field lines 300 (resulting in redirected flux 308) that is diverted towards the sidewall 267' of the rotor from the projecting section 188 of the pole piece may be regarded as at least approximately representing diverted flux due to the variable magnetic flux, and this diverted flux can be expected to influence the variable upward force at least approximately in accordance with the descriptions immediately above such that the small-gap variable upward force is lower as compared to the small gap variable upward force of a conventional levitation apparatus operating at the same small gap size. Similarly, the subset of field lines 402 (resulting in redirected flux 410) can be interpreted as at least approximately representing diverted flux that cause the large gap variable upward force to be larger as compared with that of a conventional levitation apparatus operating at the same large gap size.

Having described a number of details with respect to the influence of the cutaway sections upon the magnetic flux and the upward force associated therewith, attention will next be drawn to considerations relating to overall operation of a flywheel system utilizing levitation apparatus 240. With respect to operation of a given flywheel unit, Applicant appreciates that it may be desirable to (i) at least generally prevent touch-down events at least during routine high speed operation of the flywheel unit, and (ii) to at least generally avoid high speed operation with upper portion 228 pressed against surface region 226 of support structure 145. These conditions may be avoidable through operation of the flywheel in a fully levitated configuration, by controlling the rotor-stator gap size using feedback, as will be described immediately hereinafter, to maintain the gap size within a predetermined range of a particular value while avoiding uncontrolled upward and/or downward vertical movement. In particular, it may desirable to monitor the gap size, for example, using position sensor 170 to provide a sensor signal based on sensor gap 173, and to controllably influence the vertical movement of the flywheel rotor at least by producing the variable current based on that signal. It is noted that monitoring a value of the sensor gap may be regarded as being equivalent to monitoring a value of the rotor-stator gap, at least to an approximation, provided that the flywheel assembly is sufficiently rigid and thermally stable such that flexural and/or thermal deformations do not undermine an approximate correlation between the two gap sizes. In this regard, it is often feasible to operate in this manner, since flywheel rotors for use in high speed flywheel energy storage are often designed to be extremely rigid, at least for avoiding dynamic instabilities that are commonly associated with flexible rotors at high speeds. In the case of a different embodiment utilizing a highly flexible rotor (not shown), a person of ordinary skill in the art, having this disclosure in hand, will appreciate that in order to serve as a reliable method for monitoring the rotor-stator gap size of a given flywheel levitation apparatus, at least to within a predetermined accuracy, a position sensor may be arranged at an appropriate location and orientation such that the signal is sufficiently insensitive to any excessive flexing and/or deformation that may be present in the flexible flywheel rotor. For example, in the case of a flywheel rotor assembly having a pronounced degree of flexibility, it may be necessary to position the sensor in close proximity to rotor 163 of the flywheel levitation apparatus such that the sensor is configured for directly measuring the vertical movement of that rotor.

Irrespective of the detailed sensor configuration utilized for monitoring gap size, internal and/or external disturbances may cause disturbance-related changes to vertical movement, and any requirement for the flywheel system to tolerate these disturbances may exacerbate the challenges associated with controlling the gap-size. As one example of an external disturbance, a mechanical vibration could be applied to the flywheel unit, either artificially, for example due to the nearby operation of construction equipment, or naturally, for example due to earthquakes and/or seismic tremors. As another example of an internal disturbance, any fluctuation in the variable current, for example due to noise or other electrical transients such as electrical pick up, can cause fluctuation in the variable magnetic field resulting in a corresponding disturbance related change in the upward force on the rotor.

At least for the reason that disturbances may, at least in some applications, be unavoidable, it is often desirable, based on well known techniques, to employ some form of closed-loop feedback, as discussed above and as will be described in greater detail hereinafter, to control the vertical movement of the flywheel for at least generally maintaining the rotor-stator gap size to within a predetermined range of values such that uncontrolled vertical movement is at least generally avoided. In particular, it may be desirable to avoid uncontrolled vertical movement at least to prevent (i) touchdown and (ii) continuous operation of the flywheel in a vertically constrained mode with uppermost shaft portion 228 pressed against surface region 226.

Figure 12:
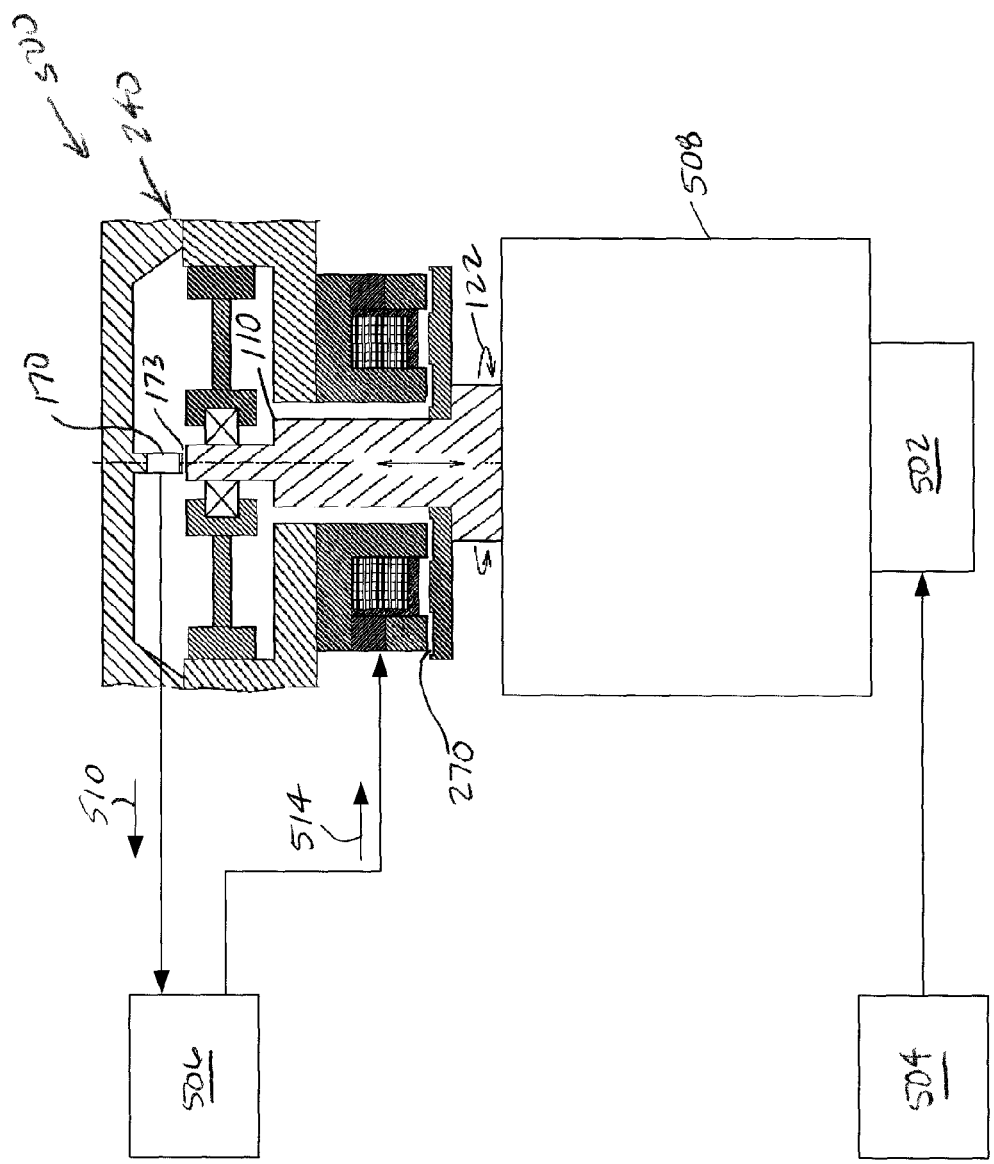
FIG. 12 is a partial block diagram showing an overall system including a control arrangement and flywheel unit configured according to the present disclosure.

Attention is now directed to FIG. 12 which is a diagrammatic representation of a flywheel system, generally indicated by reference number 500, including flywheel unit 240 (FIG. 6) having a motor 502 controlled by a motor controller 504 in electrical communication therewith, and a levitation controller 506 in electrical communication with levitation apparatus 240 as well as position sensor arrangement 170. A flywheel rotor 508 is diagrammatically shown and mounted for rotation with shaft 110. The position sensor may be configured, as described above, to at least approximately monitor gap size 173 as being indicative of rotor-stator gap size 270 and to produce a sensor signal 510 based thereon such that levitation controller 506 is in electrical communication with the flywheel levitation apparatus and configured for producing variable current 514, responsive to the sensor signal, for maintaining the flywheel rotor at or near some predetermined axial height to maintain the rotor-stator gap size within a given range of a predetermined value. As described previously, in this mode of operation the steady magnetic field from the permanent magnet may provide a majority of the force needed for overcoming the weight of the flywheel rotor assembly, as steady upward force 204 (FIG. 6) and the coil may be configured to produce a sufficient variable magnetic field 178 (FIG. 6), responsive to the sensor signal, to provide correspondingly sufficient variable force 206 (FIG. 6) to compensate and correct for any disturbance-related changes to the gap size.

Control unit 506 may be configured based on a number of well known techniques. For example the controller can utilize a well known proportional-integral-derivative (PID) controller that is configured and tuned to correct an error between a measured gap size and a predetermined desired gap size, by computing and then instigating a corrective action that can adjust the current accordingly and rapidly, to keep the error to within a given range of a predetermined value.

Applicant recognizes, even having well known feedback control techniques in hand, that it can be challenging to reliably configure and operate a given flywheel system for tolerating typical disturbances that can be expected in many practical applications. In particular, Applicant has observed that it can be especially challenging to configure a flywheel unit having a sufficient total range of vertical movement, and configured for at least generally avoiding uncontrolled vertical movement, especially in an environment where the flywheel unit is expected to tolerate substantial externally induced vibrations.

In one example, the flywheel system may be continuously operated with a rotor-stator gap within a given range of a predetermined value, and in the event of a small upward displacement, as one example of a disturbance-related change in the vertical movement, the sensor may detect the displacement and the control unit and may subsequently react to a resulting change to the sensor signal to attenuate the disturbance by reducing the current in a continuously controlled manner, for example based on a PID algorithm, while continuously monitoring the sensor signal (as part of the feedback), and responsively adjusting the current such that the rotor-stator gap is returned to within the given range. It is noted that the feedback control operating in accordance with this first example may be regarded as exhibiting stable performance.

In another example, in response to detection by the sensor of a larger upward displacement, the control unit may lower the current with a correspondingly and appropriately rapid time constant, but the corresponding reduction in variable magnetic field may be insufficient to compensate for the increasing steady upward force resulting from the diminishing gap size, and this may lead to uncontrolled upward vertical movement resulting in momentary and/or sustained contact between lower surface region 226 and uppermost region 228 of the shaft. In this case, the flywheel system, including the feedback controller and the flywheel levitation apparatus, may be regarded as exhibiting unstable performance at least for the reason that the control unit, at least momentarily, loses control over the gap size during the course of operation and therefore ceases to maintain the gap height in a stable and controlled manner.

It is noted that for a given flywheel unit there may be at least two conditions under which a conventional flywheel levitation apparatus can exhibit unstable performance resulting in uncontrolled vertical movement of the flywheel rotor assembly. In a first unstable mode of operation, a disturbance related change in vertical movement of the flywheel rotor may cause the rotor to move into an upper portion of the total range of vertical movement corresponding to a small rotor-stator gap, and if the steady magnetic force at this small rotor-stator gap is by itself sufficient to levitate the entire weight of the flywheel rotor assembly, then the vertical movement thereof could cause the flywheel to be further levitated in an uncontrolled vertical movement and continuously maintained at the minimum gap size and with upper shaft surface 228 pressed against surface region 226 of rigid sensor housing 224 (FIG. 6). In a second unstable mode of operation, a disturbance related change may cause the flywheel rotor to move to a lower portion of the total range of vertical movement, corresponding to a large rotor-stator gap, and if the total upward force for this large gap is insufficient for lifting the entire weight of the rotor, then the vertical movement of the rotor could cause the flywheel to drop, in an uncontrolled downward movement, to a sufficiently low height such that the conventional levitation apparatus is incapable of levitating the flywheel rotor.

Applicants appreciate that it may be highly advantageous to configure a flywheel unit for at least generally avoiding operation in either of the foregoing two unstable modes, therefore at least generally avoiding uncontrolled upward and/or downward movement of the flywheel rotor assembly. Furthermore, Applicant appreciates that in the context of a given flywheel unit, it may be challenging to configure a conventional levitation apparatus for avoiding one or both of these unstable modes. On one hand, for a given conventional levitation apparatus it may be possible to avoid the first unstable mode by using a weaker permanent magnet arrangement that produces a weaker steady magnetic flux and therefore lifts a smaller fraction of the weight of the flywheel rotor. On the other hand, it is to be understood that this approach may exacerbate a tendency for operation in the second unstable mode of operation, and may increase the need for a greater amount of variable upward force. For a given flywheel system, the foregoing tradeoff may be difficult to resolve. In many cases, for a flywheel rotor assembly having a given total weight, and a given requirement for a total range of vertical movement, these challenges may be sufficiently pronounced such that there may be no practical solution using a conventional levitation apparatus which serves to resolve concerns for the entire potential range of vertical motion of the flywheel. In particular, a requirement for a greater amount of upward vertical force may require a coil to be capable of producing variable lifting force of sufficiently high magnitude so as to exceed reasonable requirements relating to considerations that may include one or more of size, power, thermal dissipation, and radial stresses.

Applicant further recognizes that at least in many cases the foregoing tradeoff may be resolved by utilizing, for example, the modified levitation apparatus as described herein with reference to FIGS. 6-12 and throughout this overall disclosure. It is noted that at least in comparison to a conventional flywheel levitation apparatus, the levitation apparatus described herein addresses these challenges at least for the reason that this levitation apparatus exhibits (i) a smaller lifting force for small gap sizes, as compared with a conventional levitation apparatus and (ii) a higher lifting for large gap sizes as compared with the conventional levitation apparatus. These advantages may substantially diminish challenges associated with operation of a given flywheel unit in a fully levitated mode of operation. As another advantage, the levitation apparatus described herein may be configured, for a given flywheel unit, such that the steady field produced by the permanent magnet levitates a larger fraction of the total weight of the flywheel rotor, as compared with a conventional levitation apparatus, for all portions of the total vertical movement of the flywheel rotor while still providing for maintaining vertical control throughout the full range of potential vertical travel of the flywheel.

A person of ordinary skill in the art, having this disclosure in hand, may appreciate that in addition to providing practical configurations in certain applications where conventional lift apparatus may be impractical, a levitation apparatus configured according to this disclosure may exhibit other advantageous characteristics based on the concepts that have been brought to light herein. These characteristics include but are not limited to (i) lower power and correspondingly reduced requirements for dissipation of heat, and (ii) smaller physical size, especially including the outer diameter of the rotor. It is further noted that both of these characteristics can cooperatively result in configurations requiring reduced quantities of raw materials and a correspondingly lower cost.

Figure 13:
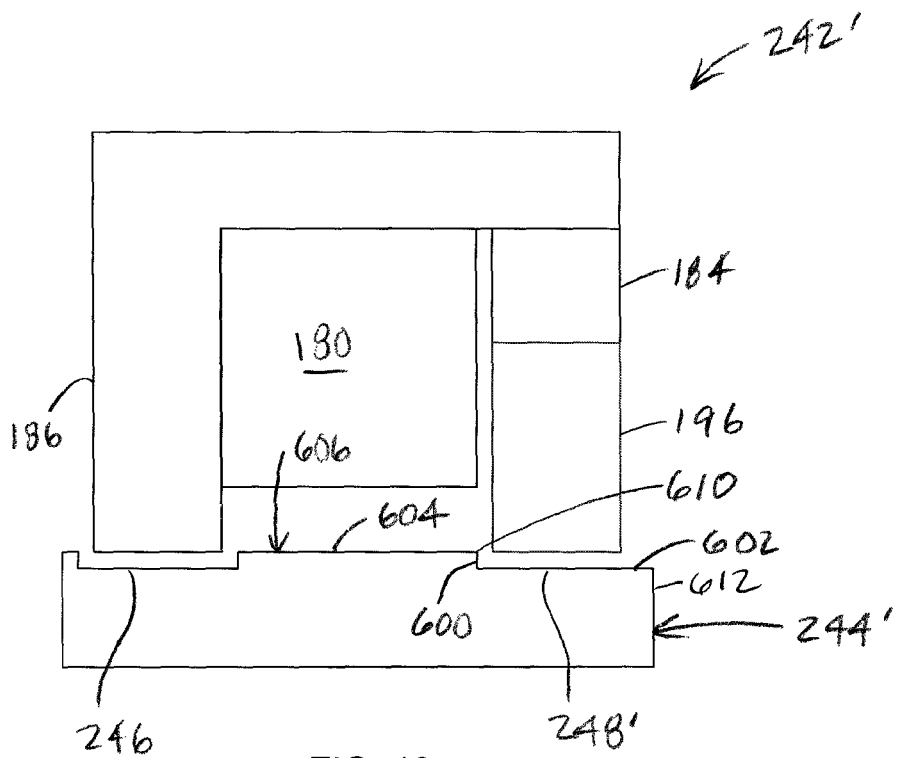
FIG. 13 is a diagrammatic view, in elevation, of another embodiment of a levitation apparatus produced according to the present disclosure and illustrating the appearance of its stator and rotor components.

Attention is now directed to FIG. 13 which is a diagrammatic view of another embodiment of a flywheel levitation apparatus that is generally indicated by the reference number 242' which can be used in flywheel unit 240 of FIG. 6 in place of flywheel levitation apparatus 240. In this embodiment, a modified rotor 244' defines inner slot 246 and an outer cutaway section 248'. The latter includes a peripheral sidewall 600 that extends upwardly from a floor 602 such that the peripheral sidewall delimits an inner periphery of the floor. The peripheral sidewall extends upward to intersect a major surface 604 of a rotor face 606 of the rotor to form a rotor edge 610 so that the rotor edge joins peripheral sidewall 600 with the major surface. Floor 602 further includes an outer periphery that is delimited by an outer edge of the rotor having an outer surface 612 that extends downward from the outer edge. It should be appreciated that the configuration of rotor 244', insofar as the presence of rotor edge 610, peripheral sidewall 600 and floor 602 are concerned, functions in essentially in the same manner as rotor 244 as described with respect to FIGS. 9-11 for field line group 280c such that these features enhance vertical lift in the large gap mode while reducing vertical lift in the small gap mode relative to a conventional rotor. Moreover, the appearance of the magnetic flux lines is essentially the same as that of FIGS. 9-11 for field line groups 280a and 280b and therefore has not been reproduced onto FIG. 13.

Referring to FIG. 8 in conjunction with FIG. 13, the lifting force produced using rotor 244' is indicated in FIG. 8 by the reference number 700. As is evidenced by plot 700, the configuration of rotor 244' provides a significant improvement with respect to gap sensitivity in both small gap mode and the large gap mode, as compared to conventional rotor plot 222. While the improvement is somewhat reduced as compared to plot 276 produced in view of modified rotor 244, it should be appreciated that rotor 244' can tolerate even higher rotational speeds than rotor 244 based on the use of an outer notch configuration in place of an outer slot configuration.

Figure 14:
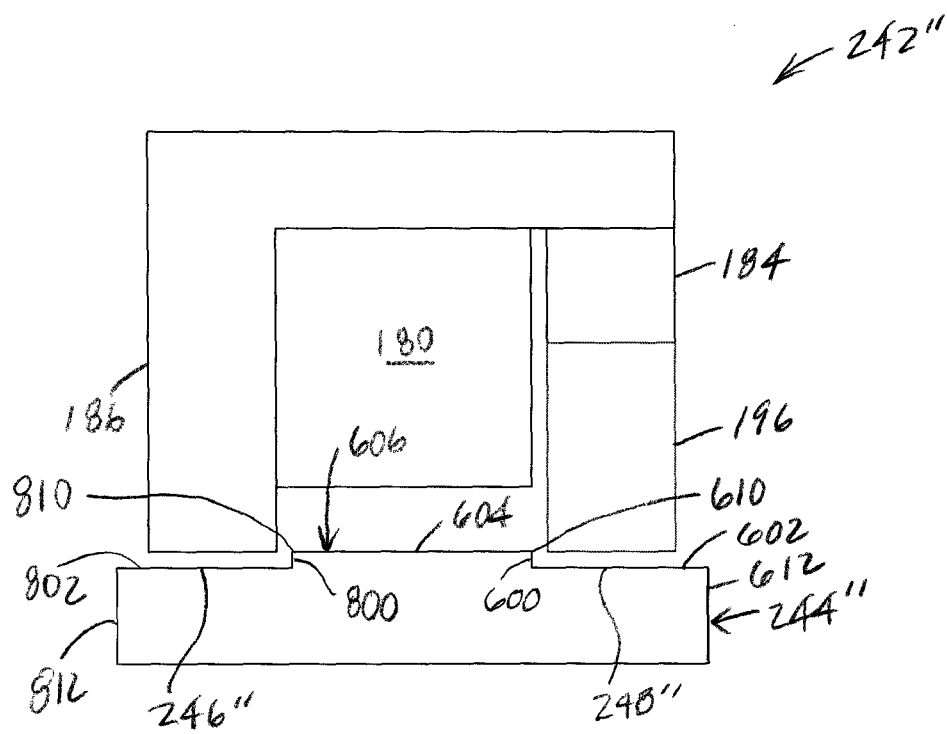
FIG. 14 a diagrammatic view, in elevation, of still another embodiment of a levitation apparatus produced according to the present disclosure and illustrating the appearance of its stator and rotor components.

Attention is now directed to FIG. 14 which is a diagrammatic view of still another embodiment of a flywheel levitation apparatus that is generally indicated by the reference number 242" which can be used in flywheel unit 240 of FIG. 6 in place of flywheel levitation apparatus 240. In this embodiment, a modified rotor 244" defines an inner cutaway section 246" and an outer cutaway section 248". The outer cutaway section can be configured identical to outer cutaway section 248' of FIG. 13 in a notch configuration. Accordingly, embodiment 242" operates in the same manner as embodiment 242' with respect to the outer cutaway section. Inner cutaway section 246" can likewise be configured in the form of a notch wherein a peripheral sidewall 800 extends upwardly from a floor 802 such that the peripheral sidewall delimits an inner periphery of the floor. The peripheral sidewall extends upward to intersect major surface 604 of rotor face 606 to form a rotor edge 810 so that the rotor edge joins peripheral sidewall 800 with the major surface. Floor 802 further includes an inner periphery (with respect to the overall diameter of the rotor) that is delimited by an inner edge or inner diameter of the rotor having an inner surface 812 that extends downward from the outer edge. It should be appreciated that the configuration of rotor 244", insofar as the presence of rotor edge 810, peripheral sidewall 800 and floor 802 are concerned, functions in essentially in the same manner as rotor 244 as described with respect to FIGS. 9-11 for field line group 280b such that these features enhance vertical lift in the large gap mode while reducing vertical lift in the small gap mode relative to a conventional rotor. Moreover, the appearance of the magnetic flux lines is essentially the same as that of FIG. 9 for flux group 280b and is a minor image of FIGS. 10 and 11, the appearance of these field lines and associated descriptions therefore have not been reproduced for purposes of brevity.

Referring to FIG. 8 in conjunction with FIG. 14, the lifting force plot produced using rotor 244" is indicated in FIG. 8 by the reference number 820. As is evidenced by plot 820, the configuration of rotor 244" provides a significant improvement with respect to gap sensitivity in both small gap mode and the large gap mode as compared to conventional rotor plot 222. While the improvement in gap sensitivity is somewhat reduced as compared to plot 700 produced in view of rotor 244', it should be appreciated that rotor 244" shares the ability to tolerate even higher rotational speeds than rotor 244. Moreover, the family of plots in FIG. 8 demonstrates that the lifting force can be customized, for example, by changing the rotor to provide relatively fewer or relatively more features that cooperate with pole pieces to customize the lifting behavior. In this regard, even more customization is available through increasing the overall number of pole pieces, for example, by providing one or more additional pairs of pole pieces to even further reduce gap sensitivity or, as another example, by dividing a projecting section into two or more projecting sections, each of which has a cylindrical wall thickness that is thinner than that of the overall pole piece, and each of which is received in a corresponding slot.

Figure 15:
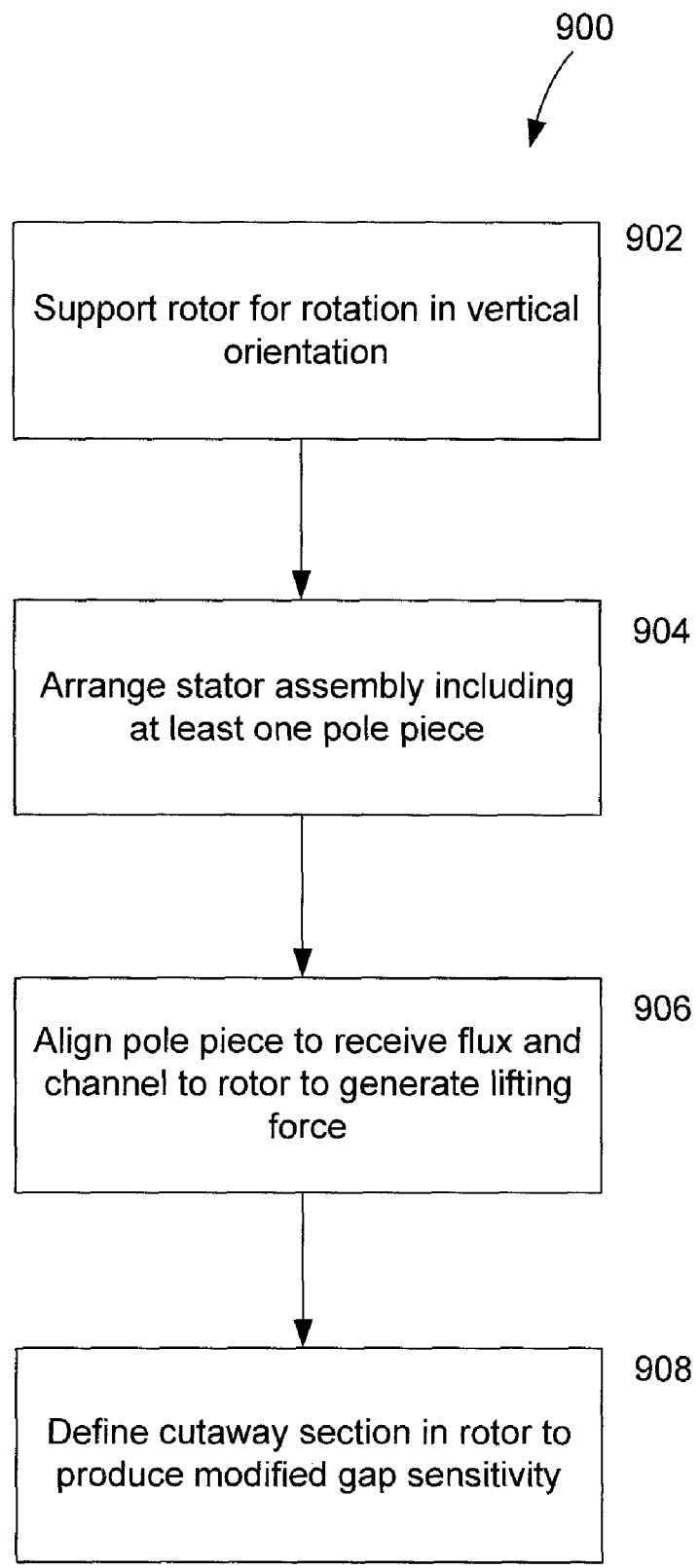
FIG. 15 is a flow diagram illustrating one exemplary embodiment of a method that is performed according to the present disclosure.

Turning to FIG. 15, a method for levitating a flywheel, for use with a flywheel driven power storage system, is generally indicated by the reference number 900. At step 902, a rotor configured for the flywheel system is supported for rotation with its axis of rotation at least approximately vertically oriented. The rotor is supported to permit a limited amount of vertical movement along the axis to provide for levitation of the rotor. At 904, a stator assembly of the flywheel system is arranged having at least one pole piece that defines a projecting section. The stator assembly is configured for receiving an electrical current and for generating a magnetic flux from the current. At 906, the pole piece is aligned to receive flux from the stator assembly and channel the flux so as to generate lifting force on the rotor upward in the vertical direction to at least assist in levitating the rotor thereby influencing its vertical movement. At 908, a cutaway section is defined in the rotor for at least partially receiving the projecting section of the pole piece within the cutaway section, responsive to the vertical movement of the rotor along the axis of rotation, such that the magnetic lifting force exhibits a gap sensitivity that is smaller as compared to a gap sensitivity that would otherwise be exhibited in an absence of the cutaway section. Step 908 may be repeated, as necessary, for purposes of generating a customized lifting force profile.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A flywheel levitation apparatus for a flywheel driven power storage system, said apparatus comprising:
a rotor having a rotor face, that faces upward in a vertical direction, and an axis of rotation that is at least approximately aligned with said vertical direction, and said rotor is supported for (i) rotation around said axis and (ii) a limited amount of vertical movement along the axis that is sufficient to provide for levitating the rotor;
a stator assembly that is configured to receive a variable electrical current and to generate a variable magnetic flux therefrom which varies responsive to changes in said variable electrical current; and
at least one pole piece supported by said stator and having a projecting section, extending downward toward said rotor face, for channeling said variable magnetic flux toward said rotor to exert a variable magnetic lifting force upon said rotor upward and in said vertical direction such that said variable magnetic lifting force at least provides a component of a total lifting force to influence said vertical movement,
wherein said rotor face defines a cutaway section such that said projecting section is at least partially receivable in the cutaway section responsive to an upward vertical movement of the rotor along said axis of rotation, and said variable magnetic lifting force exhibits a modified gap sensitivity that is smaller as compared to a conventional gap sensitivity that would be exhibited in an absence of said cutaway section.

2. The flywheel levitation apparatus of claim 1 wherein said projecting section of said pole piece includes a lower surface that faces downward toward said rotor, and said cutaway section has a floor that faces upward in a confronting relationship with said lower surface to define a gap, having a gap size, between said rotor and said pole piece, such that said gap size decreases responsive to said upward movement, and said gap size increases responsive to any downward vertical movement of the rotor along said axis of rotation.

3. A flywheel system having a control unit in electrical communication with a flywheel unit, wherein said flywheel unit includes the flywheel levitation apparatus of claim 2 arranged with said rotor attached to a flywheel rotor that is aligned for rotation about said axis of rotation, and said flywheel unit includes a sensor arrangement that is configured for providing a sensor signal to said control unit for characterizing said vertical movement to at least approximately monitor said gap size, and said stator assembly is configured for electrical communication with said control unit such that said control unit, responsive to said sensor signal, provides said variable electrical current to at least contribute to maintaining said gap size within a selected range of a predetermined value.

4. The flywheel system of claim 3 wherein a disturbance in said vertical movement causes a disturbance related change in said gap size such that said gap size is outside of said selected range, and said sensor arrangement is configured to detect the disturbance related change, and said control unit and said levitation apparatus are configured to cooperate with one another to control said variation of said electrical current, responsive to said detection of the change in said gap size by the sensor arrangement, for attenuating the disturbance related change to restore said gap size, in a limited interval of time, to within said range of said predetermined value, at least by causing the variable magnetic force to vary in a way that contributes to attenuating of said disturbance; and
said levitation apparatus and said control unit are configured to cooperate with one another to define a modified maximum disturbance that can be attenuated while at least substantially avoiding uncontrolled vertical movement, based on said modified gap sensitivity of said variable magnetic force, and said modified maximum disturbance is larger as compared to a conventional maximum disturbance that would otherwise be exhibited by a different flywheel system having a conventional flywheel levitation apparatus having no cutaway section and exhibiting said conventional gap sensitivity.

5. The flywheel levitation apparatus of claim 2 wherein said stator assembly includes a permanent magnet arrangement that is aligned in magnetic communication with said pole piece such that the permanent magnet arrangement produces a steady magnetic flux that is channeled by said pole piece as part of a total magnetic flux that is made up of the steady magnetic flux and the variable magnetic flux, and said pole piece channels said steady magnetic flux toward said rotor to exert a steady magnetic lifting force upon said rotor in said vertical direction such that said steady magnetic lifting force provides an additional component of said total lifting force to influence said vertical movement.

6. The flywheel levitation apparatus of claim 5 wherein said gap size changes in response to the vertical movement of the rotor along said axis of rotation such that said rotor is operable in each one of (i) a large-gap configuration corresponding to a first gap size, and (ii) a small-gap configuration corresponding to a second gap size,
wherein, in said small gap configuration, said steady magnetic lifting force is smaller as compared to a conventional steady magnetic lifting force that would be exhibited in a conventional flywheel levitation apparatus having the same first gap size and in the absence of said cutaway section, and
wherein, in said large gap configuration, said steady magnetic lifting force is larger as compared to a conventional steady magnetic lifting force that would be exhibited in a conventional flywheel levitation apparatus having the same second gap size and in the absence of said cutaway section.

7. The flywheel levitation apparatus of claim 5 wherein said pole piece serves as a first pole piece, and said stator assembly includes a second pole piece having a second projecting section extending downward towards said rotor, and said second pole piece is aligned in magnetic communication with said permanent magnet arrangement for providing a magnetic circuit such that said total magnetic flux returns to said permanent magnet arrangement along a closed path that passes though (i) said first pole piece, (ii) said rotor and (iii) said second pole piece.

8. The flywheel levitation apparatus of claim 5 wherein said flywheel rotor and said rotor have a total combined weight, and said stator and said rotor are configured to cooperate with one another such that said total lifting force on said rotor is sufficient for overcoming said combined weight for levitating said rotor.

9. The flywheel levitation apparatus of claim 5 wherein said permanent magnet arrangement includes a plurality of permanent magnets that cooperate with one another to define at least one magnet surface, and said pole piece has an input surface that is aligned in a confronting relationship with said magnet surface to receive said steady magnetic flux for said channeling by said pole piece, and the steady magnetic flux, produced by said plurality of permanent magnets, exhibits spatial fluctuations across the input surface, and said pole piece serves to smooth said steady magnetic flux such that said lower surface of said pole piece exhibits output fluctuations that are reduced as compared to said spatial fluctuations.

10. A flywheel system including the flywheel levitation apparatus of claim 5 having a flywheel rotor of a given weight and configured to move over a given vertical movement range such that, for any position of the flywheel rotor in the vertical movement range, the steady field produced by the permanent magnet levitates a larger fraction of the given weight of the flywheel than otherwise would be levitated in a conventional flywheel system having a rotor without said cutaway section.

11. The flywheel levitation apparatus of claim 1 wherein said projecting section and said cutaway section are arranged to cooperate in an annular configuration.

12. The flywheel levitation apparatus of claim 5 wherein said projecting section and said cutaway section are arranged to cooperate in an annular configuration.

13. The flywheel levitation device of claim 12 wherein said projecting section is in the form of a cylindrical member having a cylinder wall with a wall thickness, and said cutaway section is in the form of a slot having a width that is sufficient for receiving the wall thickness of the pole piece therein.

14. The flywheel levitation apparatus of claim 13 wherein said slot is widthwise delimited by a pair of opposing upwardly extending peripheral sidewalls, and said sidewalls are arranged such that said pole piece is at least partially receivable, responsive to said vertical movement of the rotor, between said sidewalls.

15. The flywheel levitation apparatus of claim 14 wherein said projecting section of said pole piece includes a lower surface that faces downward toward said rotor, and said cutaway section has a floor that faces upward in a confronting relationship with said lower surface to define a gap, having a gap size, between said rotor and said pole piece, and said gap size changes in response to the vertical movement of the rotor along said axis of rotation such that said rotor is operable in each one of (i) a large gap configuration corresponding to a large gap size, and (ii) a small gap configuration corresponding to a small gap size.

16. The flywheel levitation apparatus of claim 15 wherein in said small gap configuration a portion of said steady magnetic flux is diverted towards said sidewalls from said projecting section to influence the steady magnetic lifting force to provide a modified small-gap steady magnetic lifting force that is smaller as compared to a conventional small-gap steady magnetic force that would be exhibited in a conventional flywheel levitation apparatus having the same small gap size, and in the absence of said cutaway section.

17. The flywheel levitation apparatus of claim 15 wherein at least a selected one of the pair of sidewalls intersects a major surface of said rotor face to form a peripheral edge such that the peripheral edge joins the selected sidewall with the major surface, and in said large gap configuration a portion of said steady magnetic flux is diverted towards said peripheral edge, from said projecting section of said pole piece, to influence the steady magnetic lifting force to provide a modified large gap-steady magnetic lifting force that is larger as compared to a conventional large-gap steady magnetic force that would be exhibited in a conventional flywheel levitation apparatus having the same large gap size, and in the absence of said cutaway section.

18. The flywheel levitation apparatus of claim 15 wherein each of said pair of sidewalls is aligned in an at least approximately vertical direction, and said sidewalls are arranged such that said pole piece is at least partially receivable, responsive to said vertical movement of the rotor, between said sidewalls.

19. The flywheel levitation apparatus of claim 15 wherein said floor of said slot has a first width, and the rotor face defines an upper opening, leading into said slot, having a second width, and at least one of said sidewalls is chamfered such that the second width is larger than the first width.

20. The flywheel levitation apparatus of claim 19 wherein an inner one of said pair of sidewalls is chamfered such that the inner sidewall slants inward, towards the axis of rotation such that the second width is greater than the first width.

21. The flywheel levitation apparatus of claim 19 wherein an outer one of said pair of sidewalls is chamfered such that the outer sidewall slants outward, away from the axis of rotation such that the second width is larger than the first width, and said sidewalls are arranged such that said pole piece is at least partially receivable, responsive to said vertical movement of the rotor, between said sidewalls.

22. The flywheel levitation apparatus of claim 12 wherein said projecting section of said pole piece includes a lower surface that faces downward toward said rotor, and said cutaway section has a floor that faces upward in a confronting relationship with said lower surface to define a gap, having a gap size, between said rotor and said pole piece, and said projecting section is in the form of a cylindrical member having a cylinder wall with a wall thickness and an inside diameter, and said cutaway section of the rotor includes an upwardly extending peripheral sidewall that delimits an inner periphery of the floor such that at least a portion of said projecting section is receivable by the cutaway section to form a radially spaced apart relationship between the peripheral wall of the rotor and the inner diameter of the pole piece and said gap size changes in response to the vertical movement of the rotor along said axis of rotation such that said rotor is operable in each one of (i) a large-gap configuration corresponding to a large gap size, and (ii) a small-gap configuration corresponding to a small gap size.

23. The flywheel levitation apparatus of claim 22 wherein in said small gap configuration said spaced apart relationship, between said peripheral sidewall and said inner diameter of said pole piece, defines a radial distance that is sufficiently small such that a portion of said steady magnetic flux is diverted across said radial distance, from said projecting section, to said peripheral sidewall, to modify the steady magnetic lifting force to produce a modified small-gap steady magnetic lifting force that is smaller as compared to a conventional small-gap steady magnetic levitation force that would be exhibited in a conventional flywheel levitation apparatus having the same small gap size, and in the absence of said cutaway section.

24. The flywheel levitation apparatus of claim 22 wherein said projecting section includes an inside wall having said inside diameter, and said inside wall and said lower surface intersect to form an inner edge of the projecting section, and said peripheral sidewall intersects a major surface of said rotor face to form a rotor edge such that the rotor edge joins the peripheral sidewall with the major surface, and in said large-gap configuration a portion of said steady magnetic flux is diverted towards said rotor edge, from said inner edge of the projecting section, and a distance between the rotor edge and the inner edge is sufficiently small such that the diverted portion of flux is sufficiently intense to modify the steady magnetic lifting force to produce a modified large-gap steady magnetic lifting force that is larger as compared to a conventional large-gap steady magnetic lifting force that would be exhibited in a conventional flywheel levitation apparatus having the same large gap size, and in the absence of said cutaway section.

25. The flywheel levitation apparatus of claim 22 wherein the floor of the cutaway section is delimited by an outer edge and said rotor has an outer surface that extends downward from said outer edge of said floor.

26. The flywheel levitation apparatus of claim 12 wherein said projecting section of said pole piece includes a lower surface that faces downward toward said rotor, and said cutaway section has a floor that faces upward in a confronting relationship with said lower surface to define a gap, having a gap size, between said rotor and said pole piece, and said projecting section is in the form of a cylindrical member having a cylinder wall with a wall thickness and an outside diameter, and said cutaway section of the rotor includes an upwardly extending peripheral sidewall that delimits an outer periphery of the floor such that at least a portion of said projecting section is receivable by the cutaway section to form a radially spaced apart relationship between the peripheral sidewall of the rotor and the outer diameter of the pole piece and said gap size changes in response to the vertical movement of the rotor along said axis of rotation such that said rotor is operable in each one of (i) a large-gap configuration corresponding to a large gap size, and (ii) a small-gap configuration corresponding to a small gap size.

27. The flywheel levitation apparatus of claim 26 wherein in said small gap configuration said spaced apart relationship, between said peripheral sidewall and said outer diameter of said pole piece, defines a radial distance that is sufficiently small such that a portion of said steady magnetic flux is diverted across said radial distance, from said projecting section, to said peripheral sidewall, to modify the steady magnetic lifting force to produce a modified small-gap steady magnetic lifting force that is smaller as compared to a conventional small-gap steady magnetic levitation force that would be exhibited in a conventional flywheel levitation apparatus having the same small gap size, and in the absence of said cutaway section.

28. The flywheel levitation apparatus of claim 26 wherein said projecting section includes an outside wall having said outside diameter, and said outside wall and said lower surface intersect to form an outer edge of the projecting section, and said peripheral sidewall intersects a major surface of said rotor face to form a rotor edge such that the rotor edge joins the peripheral sidewall with the major surface, and in said large-gap configuration a portion of said steady magnetic flux is diverted towards said rotor edge from said outer edge of said stator, and a distance between the rotor edge and the outer edge is sufficiently small such that the diverted portion of flux is sufficiently intense to modify the steady magnetic lifting force to produce a modified large-gap steady magnetic lifting force that is larger as compared to a conventional large-gap steady magnetic lifting force that would be exhibited in a conventional flywheel levitation apparatus having the same large gap size, and in the absence of said cutaway section.

29. The flywheel levitation apparatus of claim 1 wherein said projecting section includes magnetic steel.

30. The flywheel levitation apparatus of claim 1 wherein said stator assembly includes a support structure for supporting a coil, and said coil is configured to receive said variable current and to generate said variable magnetic flux based on said variable current, and said support structure, said coil, and said pole piece cooperate with one another to direct said magnetic flux into and through said pole piece such that said pole piece receives said magnetic flux as part of said channeling of said magnetic flux.

* * * * *